United States Patent
Shi et al.

(10) Patent No.: US 11,799,097 B2
(45) Date of Patent: Oct. 24, 2023

(54) SILICON PLATE, APPLICATION OF SILICON TO FUEL CELL, AND FUEL CELL STACK STRUCTURE

(71) Applicant: H2LAB PTE. LTD, Singapore (SG)

(72) Inventors: Zhengrong Shi, Shanghai (CN);
Jingbing Zhu, Shanghai (CN)

(73) Assignee: H2LAB PTE. LTD, Singapore (SG)

( * ) Notice: Subject to any disclaimer, the term of this patent is extended or adjusted under 35 U.S.C. 154(b) by 449 days.

(21) Appl. No.: 17/042,959

(22) PCT Filed: Jun. 26, 2018

(86) PCT No.: PCT/CN2018/092793
§ 371 (c)(1),
(2) Date: Sep. 29, 2020

(87) PCT Pub. No.: WO2019/232835
PCT Pub. Date: Dec. 12, 2019

(65) Prior Publication Data
US 2021/0151778 A1    May 20, 2021

(30) Foreign Application Priority Data

Jun. 7, 2018  (CN) .......................... 201810577210.5
Jun. 7, 2018  (CN) .......................... 201810577211.X
Jun. 7, 2018  (CN) .......................... 201810577217.7

(51) Int. Cl.
| H01M 8/0267 | (2016.01) |
|---|---|
| H01M 8/0258 | (2016.01) |
| H01M 8/0232 | (2016.01) |
| H01M 8/0247 | (2016.01) |
| H01M 8/2465 | (2016.01) |

(52) U.S. Cl.
CPC ....... *H01M 8/0267* (2013.01); *H01M 8/0232* (2013.01); *H01M 8/0247* (2013.01); *H01M 8/0258* (2013.01); *H01M 8/2465* (2013.01)

(58) Field of Classification Search
CPC ............. H01M 8/0267; H01M 8/0232; H01M 8/0247; H01M 8/0258; H01M 8/2465; H01M 2008/1095; H01M 8/0204
See application file for complete search history.

(56) References Cited

U.S. PATENT DOCUMENTS

| 2003/0022052 A1* | 1/2003 | Kearl .................. H01M 8/0228 |
| | | 216/17 |
| 2004/0086768 A1 | 5/2004 | Fleckner et al. |
| 2004/0099907 A1 | 5/2004 | Morimoto et al. |
| 2004/0191594 A1 | 9/2004 | Kearl |
| 2005/0048353 A1 | 3/2005 | Lisi et al. |
| 2006/0255464 A1* | 11/2006 | D'Arrigo ............ H01M 8/1097 |
| | | 257/758 |
| 2009/0202886 A1 | 8/2009 | Kaye |

FOREIGN PATENT DOCUMENTS

| CN | 101000968 | 7/2007 |
|---|---|---|
| CN | 100369304 | 2/2008 |
| CN | 100397687 | 6/2008 |
| CN | 100483829 | 4/2009 |
| CN | 101707254 | 5/2010 |
| CN | 101867052 | 10/2010 |
| CN | 101894954 | 11/2012 |
| EP | 1282183 | 2/2003 |
| JP | 2003059500 | 2/2003 |
| JP | 2005518652 | 6/2005 |
| JP | 2016201300 | 12/2016 |
| WO | 2005069922 | 8/2005 |
| WO | 2007121336 | 10/2007 |

OTHER PUBLICATIONS

"International Search Report (Form PCT/ISA/210) of PCT/CN2018/092793", dated Dec. 12, 2018, with English translation thereof, pp. 1-4.
"Office Action of Australia Counterpart Application," dated Oct. 28, 2021, p. 1-p. 8.
"Search Report of Europe Counterpart Application", dated Feb. 10, 2022, p. 1-p. 11.
"Office Action of Japan Counterpart Application", dated Apr. 26, 2022, p. 1-p. 3.

* cited by examiner

*Primary Examiner* — Muhammad S Siddiquee
(74) *Attorney, Agent, or Firm* — JCIPRNET

(57) ABSTRACT

The present invention discloses a silicon plate, a method for producing a silicon plate, an application of silicon to a fuel cell, a fuel cell stack structure, a fuel cell, and an application of a fuel cell. The silicon plate is made of a doped conductive crystalline silicon material, and has an internal cooling medium flow channel, a front reducing agent flow channel, and/or a back oxidizing agent flow channel, and each of the internal cooling medium flow channel, the front reducing agent flow channel, and/or the back oxidizing agent flow channel is provided with a silicon plate inlet-outlet combination connected to thereof. Compared with a metal plate, a graphite plate, or a composite material plate in the existing technologies, the silicon plate provided in the present invention are more advantageous in service life, costs, efficiency, and power density, and therefore significantly drives mass industrialization of fuel cells.

12 Claims, 8 Drawing Sheets

SILICON PLATE, APPLICATION OF SILICON TO FUEL CELL, AND FUEL CELL STACK STRUCTURE

CROSS-REFERENCE TO RELATED APPLICATION

This application is a 371 application of the International PCT application serial no. PCT/CN2018/092793, filed on Jun. 26, 2018, which claims the priority benefit of China Patent Applications No. 201810577211.X, 201810577217.7, and 201810577210.5, filed on Jun. 7, 2018. The entirety of each of the above-mentioned patent applications is hereby incorporated by reference herein and made a part of this specification.

TECHNICAL FIELD

The present invention pertains to the field of fuel cells, and specifically, to a silicon plate, a method for producing a silicon plate, an application of silicon to a fuel cell, a fuel cell stack structure, a fuel cell, and an application of a fuel cell.

BACKGROUND

A fuel cell is a chemical apparatus that directly converts chemical energy of a fuel into electric energy, and is also referred to as an electrochemical generator. The fuel cell has a high energy conversion rate because the fuel cell converts Gibbs free energy in chemical energy of a fuel into electric energy through an electrochemical reaction and is not limited by a Carnot cycle effect. Further, a reaction product of a fuel cell using hydrogen as a fuel is water, which is environmentally friendly and can theoretically implement zero pollution emission. Moreover, the fuel cell has no mechanical transmission component and has a few moving components, causing low noise during operation. In addition, the fuel cell has advantages of high specific energy, high reliability, a wide range of fuels, a short startup time, a small volume, being easy to carry, and the like. Therefore, the fuel cell is the most promising power generation technology at present in terms of energy conservation and ecological environment protection.

Structurally, a fuel cell generally includes electrodes, an electrolyte membrane, and a current collector. The electrodes of the fuel cell are electrochemical reaction sites in which oxidation reaction of a fuel and a reduction reaction of an oxidizing agent occur. To promote the reaction, a catalyst is usually provided on the electrode. Main functions of the electrolyte membrane are to separate an oxidizing agent from a reducing agent and to conduct ions. The current collector, usually also referred to as a bipolar plate, is an important performance element in a fuel cell stack. The bipolar plate is responsible for distributing fuels and air to surfaces of cathode and anode electrodes as well as dissipating heat of the stack, and is also a key component responsible for serially connecting single cells to generate the cell stack. The bipolar plate is mainly used to separate an oxidizing agent, a reducing agent, and a coolant and collect a current, with a significant weight on quality, a volume, costs, reliability, power density, and the like of the fuel cell stack. Costs of the bipolar plate account for 20%-60% of the total costs of the fuel cell. Therefore, the development of high-performance and low-cost bipolar plate materials is of high significance for large-scale commercial application of fuel cells. Currently, the costs of research and development of bipolar plate materials account for 40%-60% of fuel cell research and development expenses, which also verify that bipolar plates are a key core factor determining the industrialization of fuel cells.

It is verified through research that the bipolar plate needs to have characteristics of a good gas barrier function, relatively high thermal conductivity, a relatively low volume resistivity and contact resistivity, high corrosion resistance, a light weight, high strength, being suitable for batch processing, and the like.

In the existing technologies, main types of bipolar plates of fuel cells include a graphite plate and a metal plate. The graphite plate is mainly obtained by pressing graphitizable resin mixed with carbon powder or graphite powder, and has disadvantages of a large volume, low power density, and low strength. The metal plate is usually directly obtained by processing stainless steel, a titanium alloy, an aluminum alloy, and the like, and mainly has an easy-to-corrode disadvantage. Therefore, various surface modifications are usually needed, causing problems of a complex production process and high costs. Currently, there are some technical solutions in which a composite plate is used as a bipolar plate. In one technical solution, composition of a plurality of layers is used. A thin metal is used as a spacer plate, a perforated thin carbon plate is used as a flow field plate, and an ultra-thin conductive adhesive is used for bonding. Therefore, production is very cumbersome. In another technical solution, a composite material is used. Thermoplastic or thermosetting resin is mixed with a graphite powder reinforcing fiber and the like to form a preform, which is cure, graphitized, and shaped. However, conductivity is poor, and costs are high.

Therefore, a bipolar plate of a fuel cell is in need of a suitable bipolar plate material that has characteristics of a good gas barrier function, relatively high thermal conductivity, a relatively low volume resistivity and contact resistivity, high corrosion resistance, a light weight, high strength, being suitable for batch processing, and the like needed by the bipolar plate, and is undoubtedly of high significance and plays a core promotion role in a mass industrialization process of fuel cells.

SUMMARY

In view of this, the objective of the present invention is to provide a silicon plate, a method for producing a silicon plate, an application of silicon to a fuel cell, a fuel cell stack structure, a fuel cell, and an application of a fuel cell, so that a silicon plate is directly used as a bipolar plate of a fuel cell, achieving characteristics of a good gas barrier function, relatively high thermal conductivity, a relatively low volume resistivity and contact resistivity, high corrosion resistance, a light weight, high strength, being suitable for batch processing, and the like needed by the bipolar plate. In addition, compared with a metal plate, a graphite plate, or a composite material plate in the existing technologies, the silicon plate provided in the present invention has greater advantages in service life, costs, efficiency, and power density, and therefore is undoubtedly of high significance and plays a core promotion role in a mass industrialization process of fuel cells.

Before proposing the technical solutions of the present invention, the applicant has found some existing technical solutions that are similar to the present invention after careful batch search, and the applicant carefully read them and made a detailed analysis:

According to related journals and documents, a silicon material has characteristics of a low gas transmission rate, a high coefficient of thermal conductivity, being easy to process, and the like, and is an ideal substrate material in production of a micro fuel cell. In addition, plating a metal (usually a precious metal) on the surface of the silicon can achieve conductivity, higher stability, and corrosion resistance. In 2000, Kelly and Meyers first published a document on production of micro fuel cells with silicon substrates. Since then, silicon has made great progress in micro fuel cells. Kim produced a micro fuel cell with flow channel dimensions of 400 microns (width)*230 microns (depth) using silicon as a substrate, and also added heat-resistant glass with a thickness of 500 microns to the back of a silicon micro-bipolar plate, to strengthen physical strength of the micro fuel cell and overcome the disadvantage that a silicon wafer is relatively brittle. In addition, gold was plated on the silicon bipolar plate to achieve higher stability. When an output voltage is 0.6 V, actual power density of the fuel cell is 203 mW/cm$^2$, maximum power density is up to 261 mW/cm$^2$, and volume specific power density of the cell is 360 mW/cm$^3$. However, the silicon material also has some disadvantages as a bipolar plate material. For example, a precious metal needs to be plated to collect a current, which not only prolongs a production process but also increases material costs. The applicant has found through careful analysis that making use of air-tightness, heat transfer, and easy-to-process characteristics, these technologies directly use a silicon wafer as a substrate of a fuel cell and then produce a metal layer for collecting a current on the silicon substrate, so that a current generated by an electrode is collected and then flows out of the cell in a direction parallel to the surface of the silicon substrate. Because this structure conducts the current along a metal membrane layer, only a fuel cell with a relatively small area can be produced and fuel cells cannot be stacked in a plurality of layers. In addition, the silicon substrate structure cannot be internally provided with a structure for flowing of a cooling medium. As a final result of these reasons, the technical solution in which a silicon material is used as a plate substrate of a fuel cell has long been used only in micro fuel cell products.

As described above, through in-depth search, the applicant has found the existing technical solutions that seem to have disclosed an application of a silicon material to a fuel cell. To better illustrate the technical solutions of the present invention, the applicant has further specially listed the following patent documents to describe differences between these technical solutions and the present invention:

1. The Chinese invention patent with Publication No. CN100397687C discloses a cathode flow field plate of a self-breathing micro proton exchange membrane fuel cell and a production method. A novel structure processed by using a micro-electro-mechanical systems (MEMS) technology is used. Details are as follows: A structure of the flow field plate is characterized in that a cathode flow field is processed into a double-layer composite hollow structure on a silicon wafer material with a thickness of approximately 300-500 microns. On the side near air, the flow field plate is processed into a hollow flow channel perpendicular to a direction of a silicon wafer, and on the other side near a membrane electrode, is processed into a flow channel that is perpendicular to the silicon wafer and corresponding to the hollow flow channel on the side near air, so that the silicon wafer can penetrate. In the method, a silicon plate is used as a cathode substrate structure of a micro fuel cell. A precious metal conductive layer needs to be disposed on the silicon substrate to implement a current collection function needed by the plate structure, causing a complex production process and high material costs. In addition, the silicon plate can only be used to produce a micro fuel cell because a cooling water flow channel cannot be disposed.

2. The invention patent with Publication No. CN101894954B discloses a micro fuel cell packaging method based on a normal-temperature bonding technology, and provides a method for producing a cathode plate and an anode plate. Silicon dioxide of 50 nm is grown as a stress buffer layer on both sides of a double-sided silicon wafer with a crystal direction of <100> by using a thermal oxidation method, silicon nitride of 160 nm is deposited as a masking layer through low pressure chemical vapor deposition (LPCVD), Cr of 20 nm is sputtered as an adhesion layer and Au of 0.2 microns is sputtered as a current collection layer on the front side, a flow field structure pattern is photoetched, and then silicon nitride exposed after photolithography and a photoresist are removed through reactive ion etching. Then, the silicon wafer is etched by using KOH solution and an ultrasonic wave, until etched surfaces on both sides meet to form a through inlet and outlet and a through hole. Finally, silicon nitride exposed on the front side is removed through reactive ion etching, and silicon dioxide bonded on the front side is removed by using hydrofluoric acid solution. In the method, a silicon plate is also used as a plate substrate structure of a micro fuel cell. A precious metal conductive layer (Au or Pt) needs to be disposed on the silicon substrate (and Cr also needs to be disposed as an adhesive layer) to implement a current collection function needed by the plate structure, causing a complex production process and high material costs. In addition, the silicon plate can only be used to produce a micro fuel cell because a cooling water flow channel cannot be disposed.

3. The invention patent with Publication No. CN101867052A discloses a spoke-type self-breathing micro fuel cell and a method for producing a spoke-type self-breathing micro fuel cell. Silicon wafers are used as a cathode plate and an anode plate. A specific process is as follows: A silicon wafer is cleaned, a thin membrane of silicon nitride serving as an etching mask is produced on the surface of the silicon wafer through LPCVD, and a mask pattern is formed on the thin membrane by using a photolithography technology, to achieve the purpose of selective corrosion. The silicon wafer is anisotropically etched by using 40% KOH solution, a residual thin membrane of silicon nitride on the surface of the silicon wafer is removed by using a reactive ion etching method, an inlet-outlet channel with a steep sidewall is formed on the surface of the silicon wafer by using a laser processing technology, and a metal layer of Ti/Au is formed on the etched surface of the silicon wafer by using a magnetron sputtering technology for collecting and conducting a current. Similarly, in the method, a silicon plate is used as a plate substrate structure of a micro fuel cell. A precious metal conductive layer (Ti/Au) needs to be disposed on the silicon substrate to implement a current collection function needed by the plate structure, causing a complex production process and high material costs. In addition, the silicon plate can only be used to produce a micro fuel cell because a cooling water flow channel cannot be disposed.

4. The invention patent with Publication No. CN100483829C discloses a stacked silicon-based micro fuel cell stack and a method for producing a stacked silicon-based micro fuel cell stack. A silicon substrate is used, and a silicon plate etching method is specifically disclosed. Silicon dioxide is grown on both sides of a double-sided silicon wafer with a crystal direction of <100> by using a thermal oxidation method, silicon nitride of 0.1 microns is deposited as a masking layer through LPCVD, a flow field structure pattern is photoetched, and then silicon nitride exposed after photolithography and a photoresist are removed through reactive ion etching. Then, the silicon wafer is etched by using KOH solution and an ultrasonic wave, until etched surfaces on both sides meet to form a through inlet and outlet and a through hole. Similarly, in the method, a silicon plate is used as a plate substrate structure of a micro fuel cell. A precious metal conductive layer (Ti/Pt) needs to be disposed on the silicon substrate to implement a current collection function needed by the plate structure, causing a complex production process and high material costs. In addition, the silicon plate can only be used to produce a micro fuel cell because a cooling water flow channel cannot be disposed.

5. The invention patent with Publication No. CN100369304C discloses a method for producing a catalytic electrode of a silicon-based micro direct methanol fuel cell. The method is specifically disclosed as follows: A P-type or N-type silicon wafer with a crystal direction of <100> and a resistivity of 0.012-0.013 Ω·cm is cleaned and oxidized to generate a silicon dioxide layer of 1.0-1.5 microns, a flow field pattern is formed by using a photolithography technology, and then a channel flow field is etched to an etching depth of 150-240 microns on the silicon wafer by using a wet etching technology. Finally, porous silicon is formed on the surface of the silicon wafer by using an electrochemical method. After a catalyst is deposited on the surface of the porous silicon, an effective reaction area of the catalyst is greatly increased on the surface of the porous silicon. In this fuel cell, the silicon wafer is used as a carrier for a catalytic electrode material of a micro fuel cell. This is different from the technical problem to be solved and the technical solutions to be used in the present invention for producing a plate by using crystalline silicon.

In conclusion, the applicant has found that, in these existing technical solutions that seem to use a silicon material for a fuel cell, a silicon plate is only used as a substrate support of a plate component of a fuel cell, and it is necessary to coat the silicon plate with a material such as a precious metal for actual current collection of the plate component of the fuel cell, for example, in the journal described above, CN100397687C in 1, CN101894954B in 2, CN101867052A in 3, and CN100483829C in 4; or a silicon wafer is made into a porous silicon structure as a catalyst carrier and an electrode material of a fuel cell, for example, in CN100483829C in 5. In addition, these existing technologies have a common characteristic that all the technical solutions in which silicon is used as a plate substrate or an electrode material are limited to a micro fuel cell. The micro fuel cell generally includes one or at most two fuel cell units, and output power usually ranges from milliwatts to tens of watts. Further, a cooling water flow channel cannot be disposed on the silicon substrate structure, which cannot ensure heat dissipation performance. The applicant has found that no person skilled in the art has proposed the application of the concept of the technical solution to a non-micro scale-sized industrial fuel cell. Through in-depth analysis, the applicant has found that the inspiration of the existing technologies providing a process method for producing a silicon substrate by using a silicon wafer comes from a silicon chip processing technology in the electronic industry, which is specifically a MEMS processing technology. The MEMS processing technology is applied to a micro fuel cell for producing a silicon substrate or a porous silicon electrode. However, the non-micro scale-sized industrial fuel cell has a stack structure obtained by serially connecting several fuel cell units. Therefore, first, the silicon substrate cannot provide sufficient mechanical supporting force; and second, a precious metal needs to be electroplated on the silicon plate substrate to implement a current collection function. Using the MEMS processing technology to produce the non-micro scale-sized industrial fuel cell is very cumbersome and costly, and takes no competitive advantage over a metal plate or a graphite plate. More importantly, as described above, these technical solutions are intended to collect a current generated by an electrode and then make the current flow out of the cell in a direction parallel to the silicon substrate. Because this structure conducts the current along a metal membrane layer, only a fuel cell with a relatively small area can be produced and fuel cells cannot be stacked in a plurality of layers. In addition, the stack structure has high output power and generates heat during operation. Therefore, in addition to an oxidizing agent flow channel and a reducing agent flow channel, a cooling water flow channel needs to be provided on the plate. Therefore, on this basis, a person skilled in the art is not motivated to apply a silicon material to a non-micro scale-sized industrial fuel cell.

However, after learning about a fuel cell and studying and analyzing a silicon material for several decades, the inventor of this application has found that the silicon material can be directly used as a silicon plate of the fuel cell after being specifically selected and designed. Compared with a metal plate, a graphite plate, or a composite material plate in the existing technologies, the silicon plate in the present invention has surprisingly outstanding technical effects. The following technical solutions are mainly used.

A silicon plate is provided. The silicon plate is made of a doped conductive crystalline silicon material, and has an internal cooling medium flow channel, a front reducing agent flow channel, and a back oxidizing agent flow channel, and each of the internal cooling medium flow channel, the front reducing agent flow channel, and the back oxidizing agent flow channel is provided with a silicon plate inlet-outlet combination connected to thereof.

A silicon plate is provided. The silicon plate is made of a doped conductive crystalline silicon material, and has an internal cooling medium flow channel and a front reducing agent flow channel or a back oxidizing agent flow channel, and each of the internal cooling medium flow channel, the front reducing agent flow channel, or the back oxidizing agent flow channel is provided with a silicon plate inlet-outlet combination connected to thereof.

Preferably, the silicon plate includes two or more silicon wafers. The silicon wafers have flow channels on one or both sides. Surface regions of the silicon wafers that cover no flow channel are stacked together through a composite connection using a conductive material, an internal flow channel located inside the silicon plate is formed through the composite connection, and the internal flow channel serves as the internal cooling medium flow channel. A flow channel located on a non-stacked side of the silicon wafer serves as a reducing agent flow channel or an oxidizing agent flow channel.

Preferably, the doped conductive crystalline silicon material is a monocrystalline or polycrystalline doped silicon wafer, and has a resistivity not greater than 0.1 Ω·cm.

Preferably, the silicon wafer has a thickness in a range of 0.2-5 mm and a dimension in a range of 50-300 mm.

Preferably, the reducing agent flow channel and/or the oxidizing agent flow channel have/has a depth in a range of 50-300 microns and a width in a range of 500-3000 microns.

Preferably, in the present invention, a thickness of the conductive material used for the composite connection between the silicon wafers is at the micron scale, and may be 1-100 microns or 1-50 microns or 1-20 microns. A conductive metal material or a conductive non-metal material such as a conductive adhesive may be selected. Because it is difficult to process the conductive non-metal material such as the conductive adhesive to a thickness at the micron scale, and an organic solvent usually needs to be ruled out in the composite connection process, which is disadvantageous for the implementation of the process. Therefore, preferably, the conductive material in the present invention is the metal conductive material. To facilitate a good composite connection between metal conductive materials and between the metal conductive material and the silicon wafer, further preferably, the conductive material in the present invention is a metal conductive material having a eutectic bonding effect with a silicon material. In other words, at or near a eutectic temperature (the eutectic temperature in the present invention is a temperature at which eutectic reaction between silicon and the corresponding metal conductive material occurs), favorable eutectic reaction can occur between the metal conductive material and the silicon, so that a metal conductive material layer between silicon wafers and surface layers of the silicon wafers in contact with the metal conductive material layer are fused and bonded with each other and cooled to form a firmly bonded integrated silicon metal conductive alloy composite structure, finally achieving an excellent composite connection effect between the silicon wafers. Specifically preferably, the metal conductive material may be specifically a material such as nickel Ni, gold Au, silver Ag, copper Cu, or aluminum Al. The eutectic temperature between the silicon and the metal conductive material is usually significantly lower than a melting temperature of the silicon or the metal conductive material, and the eutectic temperature is usually in a range of 500-1000° C. Specifically, the eutectic temperature between the metal conductive material and the silicon may be determined based on a type of an actually used metal conductive material, which can be obtained by consulting existing technical data.

Preferably, in the method for producing a silicon plate described above, a flow channel or an inlet-outlet combination is processed on one or both sides of the silicon wafer through an etching process, a laser process, or a screen printing process; and two or more silicon wafers are stacked together through a composite connection using a conductive material, an internal flow channel located inside the silicon plate is formed through the composite connection, and the internal flow channel serves as the internal cooling medium flow channel.

Preferably, the following operation steps are included:
A10. preparing a first silicon wafer and a second silicon wafer;
A20. separately producing conductive material layers on both sides of the first silicon wafer and the second silicon wafer through a screen printing process;
A30. using the conductive material layers as masking layers, to separately produce a back first internal cooling medium flow channel and a front reducing agent flow channel on both sides of the first silicon wafer and to separately produce a front second internal cooling medium flow channel and a back oxidizing agent flow channel on both sides of the second silicon wafer through an alkaline solution etching process;
A40. separately producing a first inlet-outlet combination and a second inlet-outlet combination on the first silicon wafer and the second silicon wafer through a laser process; and
A50. laminating the first silicon wafer and the second silicon wafer, and then sintering the two silicon wafers at a high temperature, where the conductive material layers of the first silicon wafer and the second silicon wafer in contact with each other are melted down to compositely connect the two silicon wafers together, the first internal cooling medium flow channel and the second internal cooling medium flow channel correspondingly match each other to form the internal cooling medium flow channel through the composite connection, and the first inlet-outlet combination and the second inlet-outlet combination correspondingly match each other to form the silicon plate inlet-outlet combination through the composite connection.

Preferably, the following operation steps are included:
A10'. preparing a first silicon wafer and a second silicon wafer;
A20'. separately producing conductive material layers on one side of the first silicon wafer and both sides of the second silicon wafer through a screen printing process;
A30'. using the conductive material layers as masking layers, to produce a front or back first internal cooling medium flow channel on one side of the first silicon wafer and to separately produce a front or back second internal cooling medium flow channel and a front reducing agent flow channel or a back oxidizing agent flow channel on both sides of the second silicon wafer through an alkaline solution etching process;
A40'. separately producing a first inlet-outlet combination and a second inlet-outlet combination on the first silicon wafer and the second silicon wafer through a laser process; and
A50'. laminating the first silicon wafer and the second silicon wafer, and then sintering the two silicon wafers at a high temperature, where the conductive material layers of the first silicon wafer and the second silicon wafer in contact with each other are melted down to compositely connect the two silicon wafers together, the first internal cooling medium flow channel and the second internal cooling medium flow channel correspondingly match each other to form the internal cooling medium flow channel through the composite connection, and the first inlet-outlet combination and the second inlet-outlet combination correspondingly match each other to form the silicon plate inlet-outlet combination through the composite connection.

Preferably, the conductive material is a metal conductive material having a eutectic bonding effect with a silicon material, and a heating temperature of high-temperature sintering is close or equal to a eutectic temperature between the silicon material and the metal conductive material.

Preferably, an application of silicon to a fuel cell is provided. The fuel cell includes one or more fuel cell units. The fuel cell unit includes an anode plate, an anode electrode, an electrolyte membrane, a cathode electrode, and a cathode plate stacked together in sequence, where the cathode plate and the anode plate are silicon plates made of doped conductive crystalline silicon materials; and each of the silicon plates is the silicon plate described above.

Preferably, the silicon plate may serve as both a cathode plate of a single fuel cell unit and an anode plate of its adjacent single fuel cell unit.

Preferably, a fuel cell stack structure is provided. The stack structure includes at least three fuel cell units that are connected in series and stacked together.

the fuel cell unit includes an anode plate, an anode electrode, an electrolyte membrane, a cathode electrode, and a cathode plate stacked together in sequence, where the cathode plate and the anode plate are silicon plates made of doped conductive crystalline silicon materials; and each of the silicon plates is the silicon plate described above.

Preferably, the silicon plate may serve as both a cathode plate of a single fuel cell unit and an anode plate of its adjacent single fuel cell unit.

Preferably, output power of the stack structure is not less than 0.1 kW.

Preferably, a fuel cell includes a stack structure, and the stack structure includes end-mounted fuel cell units located at both ends and one or more middle fuel cell units located in the middle, where the end-mounted fuel cell units and the one or more middle fuel cell units are connected in series and stacked together; and the middle fuel cell unit includes a middle silicon plate, the middle silicon plate has an internal cooling medium flow channel, a front reducing agent flow channel, and a back oxidizing agent flow channel, and each of the internal cooling medium flow channel, the front reducing agent flow channel, and the back oxidizing agent flow channel is provided with a silicon plate inlet-outlet combination connected to thereof.

Preferably, the end-mounted fuel cell unit includes an end-mounted silicon plate and the middle silicon plate, the end-mounted silicon plate has an internal cooling medium flow channel and a front reducing agent flow channel or a back oxidizing agent flow channel, and each of the internal cooling medium flow channel, the front reducing agent flow channel, or the back oxidizing agent flow channel is provided with a silicon plate inlet-outlet combination connected to thereof.

Preferably, the middle silicon plate includes a first middle silicon wafer and a second middle silicon wafer, the first middle silicon wafer has a back first internal cooling medium flow channel, a front reducing agent flow channel, and a first inlet-outlet combination, and the second middle silicon wafer has a front second internal cooling medium flow channel, a back oxidizing agent flow channel, and a second inlet-outlet combination. A back region of the first middle silicon wafer which is not covered by the first internal cooling medium flow channel and a front region of the second middle silicon wafer which is not covered by the second internal cooling medium flow channel are stacked together through a composite connection using a conductive material, the first internal cooling medium flow channel and the second internal cooling medium flow channel correspondingly match each other to form the internal cooling medium flow channel through the composite connection, and the first inlet-outlet combination and the second inlet-outlet combination correspondingly match each other to form the silicon plate inlet-outlet combination through the composite connection.

Preferably, the end-mounted silicon plate includes an end-mounted silicon wafer and a middle silicon wafer, the end-mounted silicon wafer has a front or back first internal cooling medium flow channel and a first inlet-outlet combination, and the middle silicon wafer has a back or front second internal cooling medium flow channel, a front reducing agent flow channel or a back oxidizing agent flow channel, and a second inlet-outlet combination. A front or back region of the end-mounted silicon wafer which is not covered by the first internal cooling medium flow channel and a back or front region of the middle silicon wafer which is not covered by the second internal cooling medium flow channel are stacked together through a composite connection using a conductive material, the first internal cooling medium flow channel and the second internal cooling medium flow channel correspondingly match each other to form the internal cooling medium flow channel through the composite connection, and the first inlet-outlet combination and the second inlet-outlet combination correspondingly match each other to form the silicon plate inlet-outlet combination through the composite connection.

Preferably, a reducing agent is hydrogen gas, natural gas, coal gas, purified gas, or methanol, and an oxidizing agent is oxygen or air.

Preferably, the anode electrode, the electrolyte membrane, and the cathode electrode are membrane electrode assemblies (MEA), and the electrolyte membrane is a proton exchange membrane.

Preferably, a cooling medium is water.

Preferably, a fuel cell is provided. The fuel cell includes a stack structure, a packaging insulator, and an external installation fitting, and the stack structure is the fuel cell stack structure described above.

Preferably, an application of the fuel cell described above is provided. The fuel cell is applied to a portable product, a stationary power supply or thermal apparatus product, or a transportation product.

Based on experience of the inventor of this application in studying and analyzing silicon materials for several decades, the present invention provides the direct use of a doped conductive crystalline silicon material as a silicon plate of a fuel cell, and provides a structure design of the silicon plate. Specifically, the silicon plate is obtained through stacking and composition of two or more silicon wafers. An internal flow channel is formed through the stacking, composition, and processing, and the internal flow channel may be directly used as a cooling medium flow channel. As a skeleton structure inside the fuel cell, the silicon plate provided in the present invention can provide sufficient mechanical supporting force. Further, directly using the silicon plate as a current collection plate for current transmission in a fuel cell stacking direction can not only avoid the need to additionally dispose a metal layer membrane, but also implements a multi-layer stacking structure needed by a fuel cell with a stack structure. In addition, directly using the internal flow channel of the silicon plate as the cooling medium flow channel can further effectively transfer heat generated during operation of the fuel cell to the outside in a timely manner. Therefore, the silicon plate provided in the present invention can achieve characteristics of a good gas barrier function, relatively high thermal conductivity, a relatively low volume resistivity and contact resistivity, high corrosion resistance, a light weight, high strength, being suitable for batch processing, and the like needed by a bipolar plate of the fuel cell. Compared with a metal plate, a graphite plate, or a composite material plate in the existing technologies, the silicon plate provided in the present invention has greater advantages in service life, costs, efficiency, and power density, and therefore is undoubtedly of high significance and plays a core promotion role in a mass industrialization process of fuel cells.

The present invention further provides a preferred method for producing a silicon plate. A conductive material layer is produced on the surface of a silicon wafer. Preferably, the conductive material layer is a base metal material such as nickel or copper. The conductive material layer in the present invention serves as both a masking layer structure in a subsequent etching process of the silicon wafer and a transition bonding structure stacking two silicon wafers together. Therefore, the process is the most simple and effective and is easy to implement, and also has the lowest costs, making it suitable for batch production and application.

The present invention further provides a preferred conductive material for a composite connection between silicon wafers. Specifically, a metal conductive material having a eutectic bonding effect with a silicon material is used as a composite material for connecting silicon wafers, and sintering is performed at a eutectic temperature, so that a metal conductive material layer between the silicon wafers and surface layers of the silicon wafers in contact with the metal conductive material layer are fused and bonded with each other and cooled to form a firmly bonded integrated silicon metal conductive alloy composite structure, finally achieving an excellent composite connection effect between the silicon wafers.

It should be noted that, due to the foregoing excellent characteristics, the silicon plate provided in the present invention is particularly suitable for use in the field of non-micro fuel cell products with stack structures (in particular, a non-micro fuel cell with output power of not less than 0.1 kW), and has greater performance advantages than a metal plate, a graphite plate, or a composite material plate in the existing technologies. Certainly, a person skilled in the art can directly apply the silicon plate to the field of micro fuel cells (generally including only one or two fuel cells) based on actual needs. Compared with an existing micro fuel cell using silicon as a plate substrate, this has some outstanding technical advantages in material costs, production process, mechanical strength, and cooling performance, which should also fall within the scope of the present invention.

In the present invention, it should be particularly noted that the expressions "front" and "back" in the present invention are merely for the purpose of describing position distribution of various flow channels distributed on different sides of a silicon wafer. "front" and "back" are relative, and an actual direction varies with a reference object. "front" and "back" are not intended to limit specific directions in the present invention.

DESCRIPTION OF EMBODIMENTS

Figure 1:
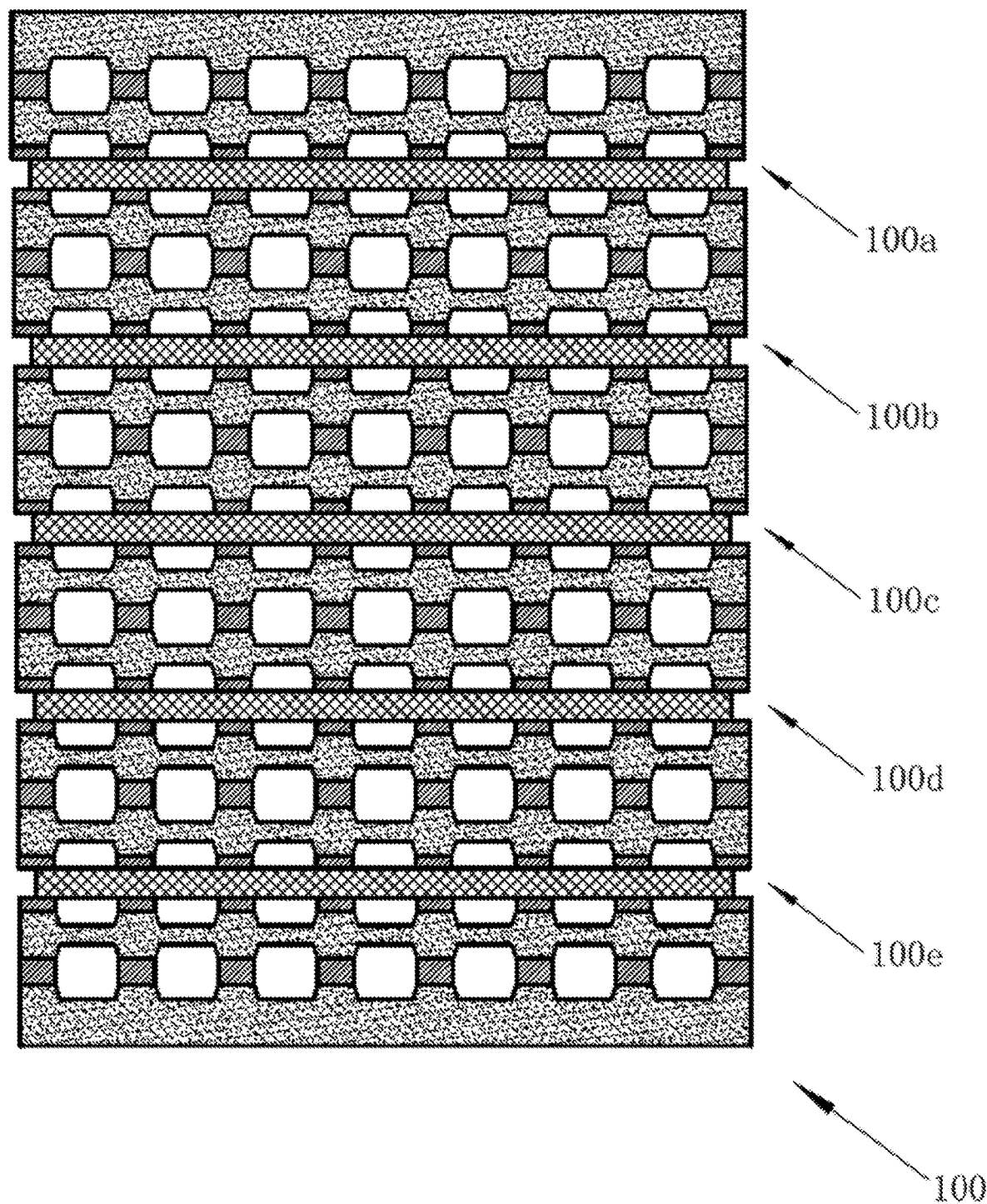
FIG. 1 is a cross-sectional schematic structural diagram of a stack structure 100 according to an embodiment of the present invention.

Embodiments of the present invention disclose a silicon plate. The silicon plate is made of a doped conductive crystalline silicon material, and has an internal cooling medium flow channel, a front reducing agent flow channel, and a back oxidizing agent flow channel, and each of the internal cooling medium flow channel, the front reducing agent flow channel, and the back oxidizing agent flow channel is provided with a silicon plate inlet-outlet combination connected to thereof.

The embodiments of the present invention further disclose a silicon plate. The silicon plate is made of a doped conductive crystalline silicon material, and has an internal cooling medium flow channel and a front reducing agent flow channel or a back oxidizing agent flow channel, and each of the internal cooling medium flow channel, the front reducing agent flow channel, or the back oxidizing agent flow channel is provided with a silicon plate inlet-outlet combination connected to thereof.

The embodiments of the present invention disclose a method for producing the silicon plate described above. A flow channel or an inlet-outlet combination is processed on one or both sides of a silicon wafer through an etching process, a laser process, or a screen printing process. Two or more silicon wafers are stacked together through a composite connection using a conductive material, an internal flow channel located inside the silicon plate is formed through the composite connection, and the internal flow channel serves as an internal cooling medium flow channel.

The embodiments of the present invention disclose an application of silicon to a fuel cell. The fuel cell includes one or more fuel cell units. The fuel cell unit includes an anode plate, an anode electrode, an electrolyte membrane, a cathode electrode, and a cathode plate stacked together in sequence. The cathode plate and the anode plate are silicon plates made of doped conductive crystalline silicon materials. Each of the silicon plates is the silicon plate described above.

The embodiments of the present invention further disclose a fuel cell stack structure. The stack structure includes at least three fuel cell units that are connected in series and stacked together. The fuel cell unit includes an anode plate, an anode electrode, an electrolyte membrane, a cathode electrode, and a cathode plate stacked together in sequence. The cathode plate and the anode plate are silicon plates made of doped conductive crystalline silicon materials. Each of the silicon plates is the silicon plate described above.

The embodiments of the present invention further disclose a fuel cell. The fuel cell includes a stack structure, a packaging insulator, and an external installation fitting, and the stack structure is the fuel cell stack structure described above.

The embodiments of the present invention disclose an application of the fuel cell described above. The fuel cell is applied to a portable product, a stationary power supply or thermal apparatus product, or a transportation product.

To describe technical solutions in the embodiments of the present invention or in the existing technologies more clearly, the following briefly describes the accompanying drawings needed for describing the embodiments or the existing technologies. Clearly, the accompanying drawings in the following description merely show some embodiments of the present invention, and a person of ordinary skill in the art can still derive other drawings from these accompanying drawings without creative efforts.

Embodiment 1

Referring to a fuel cell stack structure 100 shown in FIG. 1, the stack structure 100 includes at least three fuel cell units that are connected in series and stacked together. Specifically, in this embodiment, there are five fuel cell units. Preferably, output power of the stack structure 100 is not less than 0.1 kW. Certainly, in other embodiments of the present invention, a person skilled in the art can select a quantity of fuel cell units based on power requirements in the product field to be actually applied. This is not specifically limited in the present invention.

As shown in FIG. 1, the stack structure in Embodiment 1 includes end-mounted fuel cell units 100a and 100e located at both ends and three middle fuel cell units 100b, 100c, and 100d located in the middle. Each fuel cell unit includes an anode plate, an anode electrode, an electrolyte membrane, a cathode electrode, and a cathode plate stacked together in sequence. The cathode plate and the anode plate are silicon plates made of doped conductive crystalline silicon materials. The silicon plate serves as both a cathode plate of a single fuel cell unit and an anode plate of its adjacent single fuel cell unit.

Preferably, in this embodiment, the doped conductive crystalline silicon material is a monocrystalline or polycrystalline doped silicon wafer. Preferably, in this embodiment, the silicon wafer has a resistivity not greater than 0.1 Ω·cm. More preferably, the silicon wafer has a resistivity in a range of 0.0005-0.05 Ω·cm.

It should be noted that, during specific implementation of the present invention, a method for producing a silicon plate can be selected based on a crystalline silicon type of a specific silicon wafer, which is described in detail later in this specification.

Preferably, in this embodiment, the silicon wafer has a thickness in a range of 0.2-5 mm and a dimension in a range of 50-300 mm. A shape of the silicon wafer may be a square, a circle, or another desired shape. This is not specifically limited in specific implementation of the present invention.

Specifically preferably, in this embodiment, the silicon wafer used is an N-type monocrystalline phosphorus-doped silicon wafer shaped in a square and with a crystal direction that is not <111>. The crystal direction may be specifically a crystal direction of <100> or <110> or another crystal direction at a significant angle with the crystal direction of <111>. This facilitates the subsequent use of an alkaline solution etching process in this embodiment. A resistivity of the N-type monocrystalline phosphorus-doped silicon wafer is approximately 0.01 Ω·cm. The silicon wafer has a thickness of 0.5 mm and a dimension of approximately 150 mm.

Preferably, in this embodiment of the present invention, the silicon plate has an internal cooling medium flow channel, a front reducing agent flow channel, and/or a back oxidizing agent flow channel, and each of the internal cooling medium flow channel, the front reducing agent flow channel, and/or the back oxidizing agent flow channel is provided with a silicon plate inlet-outlet combination connected to thereof. Preferably, the silicon plate specifically includes two or more silicon wafers. The silicon wafers have flow channels on one or both sides. Surface regions of the silicon wafers that cover no flow channel are stacked together through a composite connection using a conductive material, an internal flow channel located inside the silicon plate is formed through the composite connection, and the internal flow channel serves as the internal cooling medium flow channel. A flow channel located on a non-stacked side of the silicon wafer serves as a reducing agent flow channel or an oxidizing agent flow channel.

Figure 2:
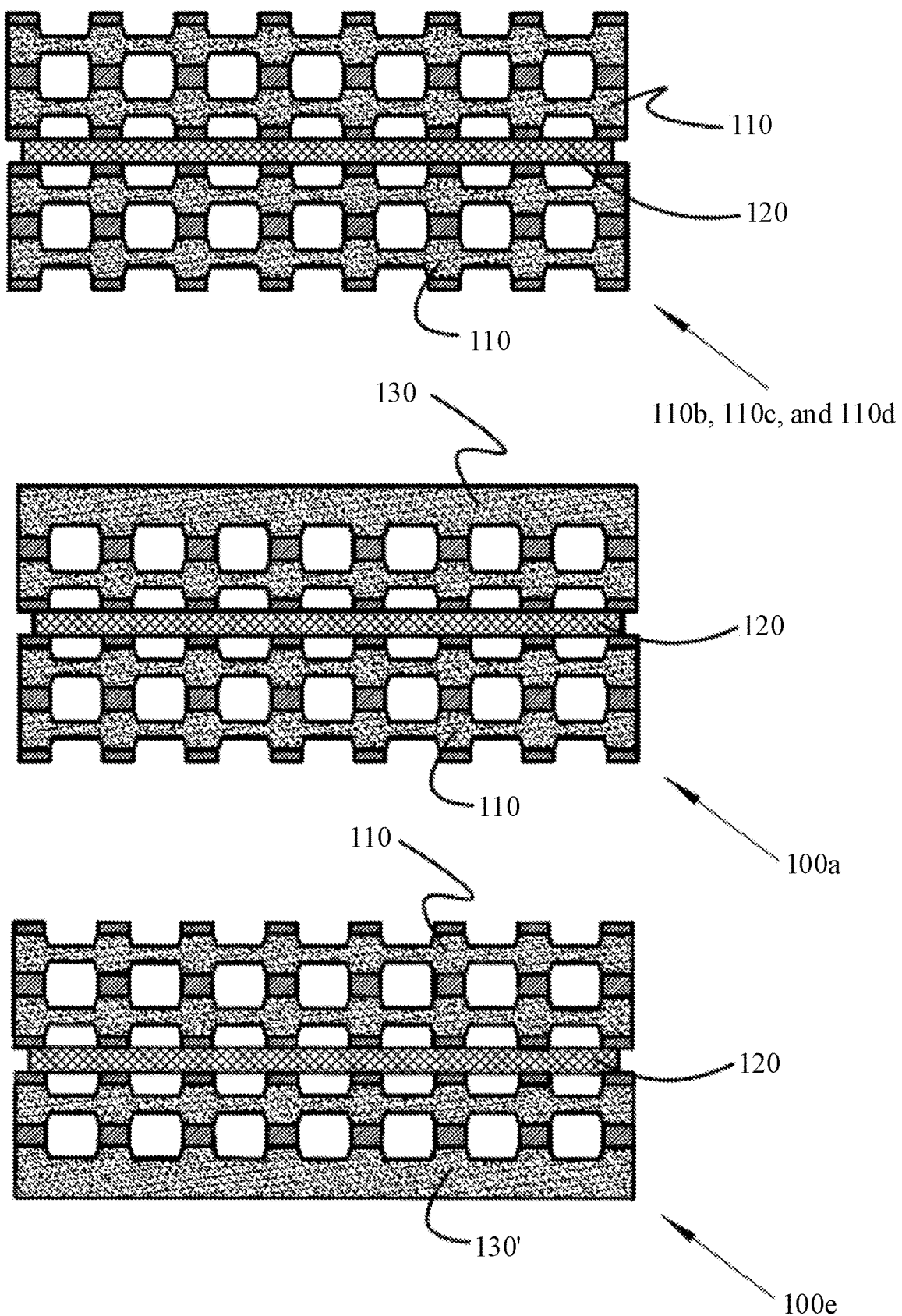
FIG. 2 is a cross-sectional schematic structural diagram of middle fuel cell units 100b, 100c, and 100d and end-mounted fuel cell units 100a and 100e according to Embodiment 1 of the present invention.
Figure 3:
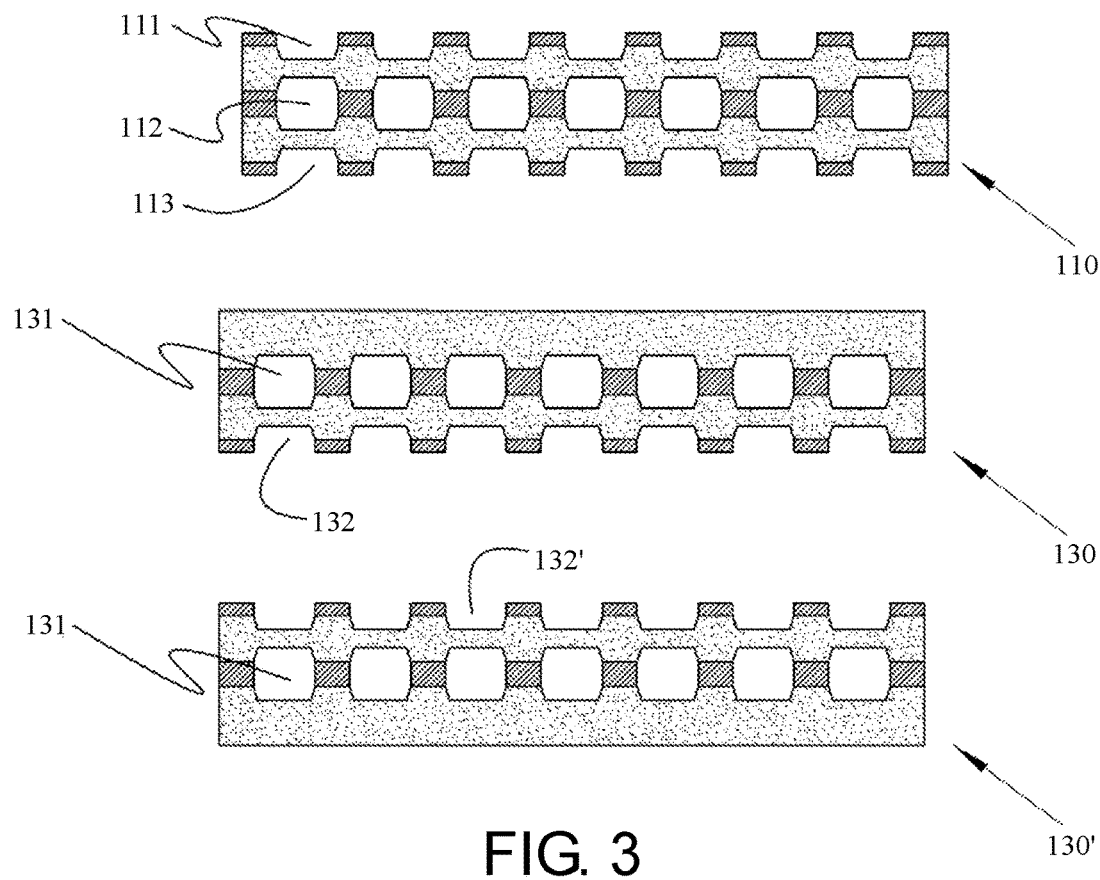
FIG. 3 is a cross-sectional schematic structural diagram of a middle silicon plate 110 and end-mounted silicon plates 130 and 130' according to Embodiment 1 of the present invention.
Figure 4:
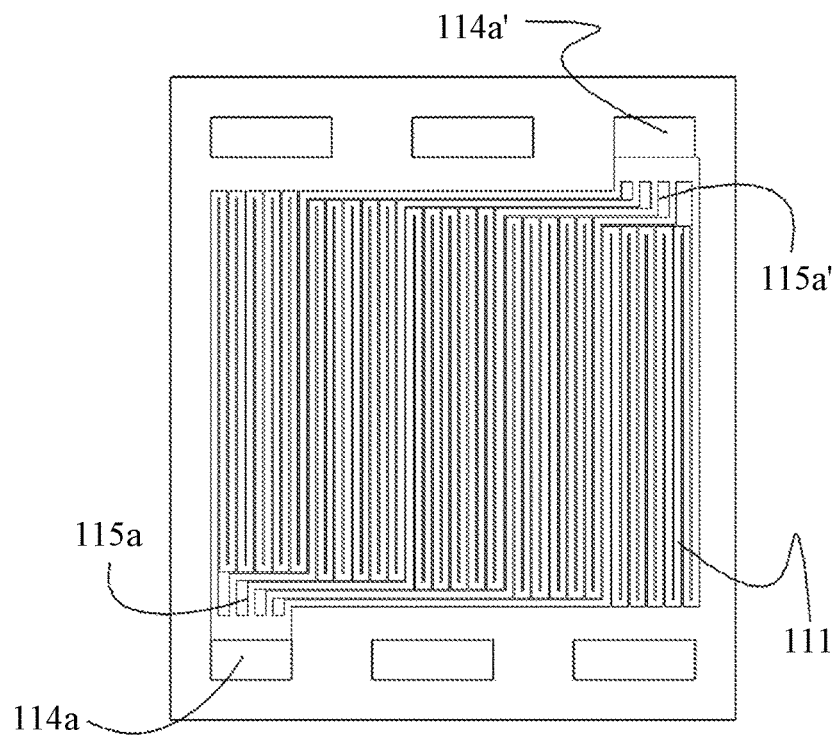
FIG. 4 is a schematic structural diagram of a reducing agent flow channel 111 in the middle silicon plate 110 according to Embodiment 1 of the present invention.

Further specifically preferably, in Embodiment 1, as shown in FIG. 2 and FIG. 3, the middle fuel cell units 100b, 100c, and 100d each include a middle silicon plate 110. The middle silicon plate 110 is obtained through composition and processing of two silicon wafers, and has an internal cooling medium flow channel 112, a front reducing agent flow channel 111, and a back oxidizing agent flow channel 113. Each of the internal cooling medium flow channel 112, the front reducing agent flow channel 111, and the back oxidizing agent flow channel 113 is provided with a silicon plate inlet-outlet combination (as shown in FIG. 4) connected to thereof. Specifically, there are three silicon plate inlet-outlet combinations for respectively being connected to the internal cooling medium flow channel 112, the front reducing agent flow channel 111, and the back oxidizing agent flow channel 113. In addition, inlets of the three silicon plate inlet-outlet combinations are respectively used to input a cooling medium, a reducing agent, and an oxidizing agent, and outlets of the three silicon plate inlet-outlet combinations are separately used to discharge the cooling medium, an excess reducing agent and oxidizing agent, and reaction products thereof that pass through the respective flow channels.

During implementation of the present invention, the reducing agent may be hydrogen gas, natural gas, coal gas, purified gas, methanol, or the like, and the oxidizing agent may be oxygen or air. A person skilled in the art can select a specific reducing agent type and oxidizing agent type based on the technical content of the present invention and the to-be-applied field. Specifically preferably, in this embodiment, the reducing agent is hydrogen gas, the oxidizing agent is oxygen, the reaction product is water, the anode electrode, the electrolyte membrane, and the cathode electrode are MEAs 120, the electrolyte membrane is a proton exchange membrane, and the cooling medium is water, which improves efficiency and power density the fuel cell stack structure provided in the present invention and reduces its costs, and makes it easy to operate and implement. In addition, the reaction product in this embodiment is water, which causes no hazardous substance and is very environmentally friendly. The MEA 120 and the proton exchange membrane in this embodiment may directly use any technical solution in the existing technologies, and are available on the market. This is a well-known industrialized technology, and this part is not described in the present invention.

To ensure the safety of insulating packaging of the fuel cell in this embodiment, an MEA 120 of each fuel cell unit is spaced apart from both sides of a silicon plate of the fuel cell unit by a certain insulating packaging safety distance, and the distance is usually set to the millimeter scale, for example, 5-15 mm. The insulating packaging safety distance is used for subsequent insulating packaging.

As shown in FIG. 4, to achieve the flow guiding uniqueness between these inlet-outlet combinations and the correspondingly connected flow channels, flow guiding channels are disposed between the inlet-outlet combinations and the correspondingly connected flow channels. The flow guiding channels and the flow channels may be produced together in the production process. A silicon plate inlet-outlet combination corresponding to the front reducing agent flow channel 111 includes an inlet 114a and an outlet 114a' shown in FIG. 4 (silicon plate inlet-outlet combinations corresponding to the remaining flow channels are shown but not marked), and flow guiding channels respectively corresponding to the inlet 114a and the outlet 114a' are an inlet flow guiding channel 115 and an outlet flow guiding channel 115', respectively.

For a shape design of a specific flow channel, inlet, and outlet on the middle silicon plate 110 in this embodiment of the present invention, reference may be made to the design in FIG. 4. Alternatively, the shape design may be any design in the existing technologies. This is not specifically limited in the present invention.

Figure 5:
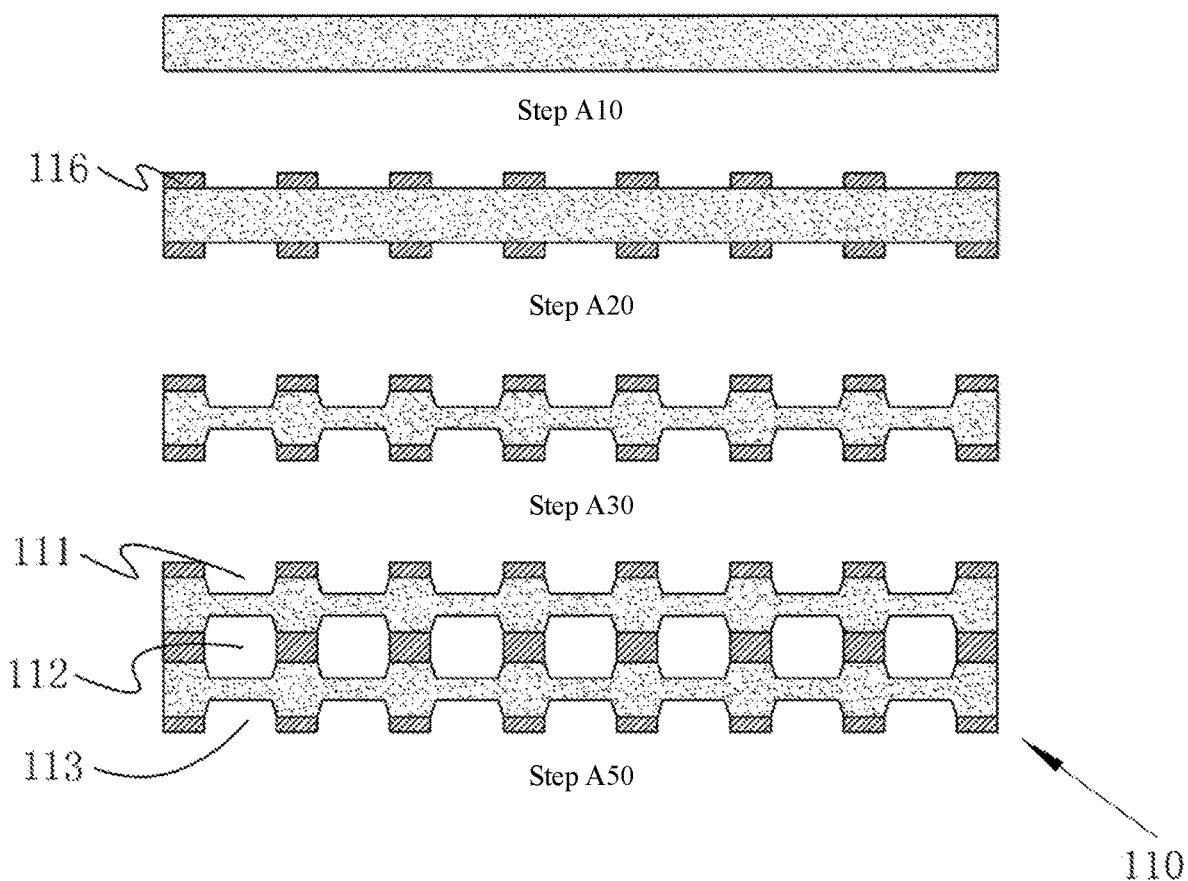
FIG. 5 is a flowchart of a production process of the middle silicon plate 110 according to Embodiment 1 of the present invention.

Further specifically, as shown in FIG. 5, in this embodiment, the middle silicon plate 110 includes a first middle silicon wafer and a second middle silicon wafer, the first middle silicon wafer has a back first internal cooling medium flow channel, the front reducing agent flow channel 111, and a first inlet-outlet combination, and the second middle silicon wafer has a front second internal cooling medium flow channel, the back oxidizing agent flow channel 113, and a second inlet-outlet combination. A back region of the first middle silicon wafer which is not covered by the first internal cooling medium flow channel and a front region of the second middle silicon wafer which is not covered by the second internal cooling medium flow channel are stacked together through a composite connection using a conductive material, the back first internal cooling medium flow channel and the front second internal cooling medium flow channel correspondingly match each other to form the internal cooling medium flow channel 112 through the composite connection, and the first inlet-outlet combination and the second inlet-outlet combination correspondingly match each other to form the silicon plate inlet-outlet combination through the composite connection. For specific flow channel structures and shapes of the back first internal cooling medium flow channel, the front second internal cooling medium flow channel, and the back oxidizing agent flow channel 113 in this embodiment, reference may be directly made to the front reducing agent flow channel 111 shown in FIG. 4. Details are omitted for simplicity.

Preferably, in this embodiment of the present invention, the reducing agent flow channel 111 and the oxidizing agent flow channel 113 have depths in a range of 50-300 microns and widths in a range of 500-3000 microns. Specifically preferably, in this embodiment of the present invention, the reducing agent flow channel 111 and the oxidizing agent flow channel 113 have depths of 100±10 microns and widths of 1000±100 microns. Depth and width design solutions of the first internal cooling medium flow channel and the second internal cooling medium flow channel are the same as those of the reducing agent flow channel 111 and the oxidizing agent flow channel 113.

In Embodiment 1, further, as shown in FIG. 2 and FIG. 3, the end-mounted fuel cell unit 100a includes an end-mounted silicon plate 130, the MEA 120, and the middle silicon plate 110, and the end-mounted fuel cell unit 100e includes an end-mounted silicon plate 130', the MEA 120, and the middle silicon plate 110. The end-mounted silicon plate 130 is obtained through composition and processing of two silicon wafers, and has an internal cooling medium flow channel 131 and a back oxidizing agent flow channel 132, and each of the internal cooling medium flow channel 131 and the back oxidizing agent flow channel 132 is provided with a silicon plate inlet-outlet combination connected to thereof. The end-mounted silicon plate 130' is obtained through composition and processing of two silicon wafers, and has the internal cooling medium flow channel 131 and a front reducing agent flow channel 132', and each of the internal cooling medium flow channel 131 and the front reducing agent flow channel 132' is provided with a silicon plate inlet-outlet combination connected to thereof. The silicon plate inlet-outlet combinations of the end-mounted silicon plates 130 and 130' in this embodiment use the same technical solution as the silicon plate inlet-outlet combination of the middle fuel cell units 100b, 100c, and 100d. Details are omitted for simplicity.

Further specifically, the end-mounted silicon plate 130 includes an end-mounted silicon wafer and a middle silicon wafer, the end-mounted silicon wafer has a back first internal cooling medium flow channel and a first inlet-outlet combination, and the middle silicon wafer has a front second internal cooling medium flow channel, the back oxidizing agent flow channel 132, and a second inlet-outlet combination. The end-mounted silicon plate 130' includes an end-mounted silicon wafer and a middle silicon wafer, the end-mounted silicon wafer has a front first internal cooling medium flow channel and a first inlet-outlet combination, and the middle silicon wafer has a back second internal cooling medium flow channel, the front reducing agent flow channel 132', and a second inlet-outlet combination. The end-mounted silicon wafer and the middle silicon wafer are stacked together through a composite connection using a conductive material, the first internal cooling medium flow channel and the second internal cooling medium flow channel correspondingly match each other to form the internal cooling medium flow channel 131 through the composite connection, and the first inlet-outlet combination and the second inlet-outlet combination correspondingly match each other to form the silicon plate inlet-outlet combination through the composite connection.

In this embodiment of the present invention, a person skilled in the art can produce the middle silicon plate 110 and the end-mounted silicon plates 130 and 130' through a plurality of processes based on structure design characteristics of the middle silicon plate 110 and the end-mounted silicon plates 130 and 130'. A typical method is as follows: A flow channel or an inlet-outlet combination is processed on one or both sides of a silicon wafer through an etching process, a laser process, or a screen printing process. Then, two or more silicon wafers are stacked together through a composite connection using a conductive material, an internal flow channel located inside the silicon plate is formed through the composite connection, and the internal flow channel serves as an internal cooling medium flow channel of the silicon plate.

Because the fuel cell units 100a, 100b, 100c, 100d, and 100e in the fuel cell stack structure 100 in the present invention are connected in series and stacked together, the stack structure in the present invention implements current collection and transmission in a stacking direction and connections between the fuel cell units in the stacking direction by using the correspondingly matched silicon plate inlet-outlet combinations, and the internal cooling medium flow channels 112 and 131, the reducing agent flow channels 111 and 132', and the oxidizing agent flow channels 113 and 132 of the fuel cell units.

In this embodiment, a thickness of the conductive material used for the composite connection between the silicon wafers is at the micron scale. A conductive metal material or a conductive non-metal material such as a conductive adhesive may be selected. Preferably, the conductive material is the metal conductive material. To facilitate a good composite connection between metal conductive materials and between the metal conductive material and the silicon wafer, further preferably, the conductive material in this embodiment is a metal conductive material having a eutectic bonding effect with a silicon material. In other words, at or near a eutectic temperature (the eutectic temperature in the present invention is a temperature at which eutectic reaction between silicon and the corresponding metal conductive material occurs), favorable eutectic reaction can occur between the metal conductive material and the silicon, so that a metal conductive material layer between silicon wafers and surface layers of the silicon wafers in contact with the metal conductive material layer are fused and bonded with each other and cooled to form a firmly bonded integrated silicon metal conductive alloy composite structure, finally achieving an excellent composite connection effect between the silicon wafers. Specifically preferably, the metal conductive material may be specifically a material such as nickel Ni, gold Au, silver Ag, copper Cu, or aluminum Al. The eutectic temperature between the silicon and these metal conductive material is usually significantly lower than a melting temperature of the silicon or the metal conductive material, and the eutectic temperature is usually in a range of 500-1000° C. Specifically, the eutectic temperature between the metal conductive material and the silicon may be determined based on a type of an actually used metal conductive material, which can be obtained by consulting existing technical data.

The expressions "front" and "back" in this embodiment are merely for the purpose of describing position distribution of various flow channels distributed on different sides of a silicon wafer. "front" and "back" are relative, and an actual direction varies with a reference object. "front" and "back" are not intended to limit specific directions in this embodiment.

Among the plurality of processes, Embodiment 1 of the present invention further provides a preferred production method. The process is the most simple and effective and is easy to implement, and also has the lowest costs. Details are as follows:

Specifically preferably, as shown in FIG. 5, Embodiment 1 provides a method for producing the middle silicon plate 110 described above, including the following operation steps:

A10. Prepare a first silicon wafer and a second silicon wafer. The silicon wafers need to be cleaned in advance. Further specifically preferably, a silicon wafer cut by using a diamond wire is used, and may be further chemically polished or mechanically polished, to reduce surface roughness and improve a production effect of the process in subsequent steps.

A20. Separately produce conductive material layers 116 on both sides of the first silicon wafer and the second silicon wafer through a screen printing process. Preferably, a thickness of the conductive material layer 116 is 1-15 microns, and a conductive material is a base metal conductive material having a eutectic bonding effect with a silicon material. Because an alkaline solution etching process needs to be used to produce a flow channel in this embodiment, the selected conductive material in Embodiment 1 cannot react with alkaline solution. Certainly, the constraint does not exist in other embodiments in which a laser process or a screen printing process is used to produce a flow channel. In this embodiment, the conductive material may be nickel or copper. Specifically, the conductive material is nickel. Certainly, in this embodiment of the present invention, a precious metal conductive material may be used, or another suitable conductive material may be used in a second preferred solution for reducing costs, which should not be construed as a limitation on the present invention.

A30. Use the conductive material layers 116 as masking layers, to separately produce the back first internal cooling medium flow channel and the front reducing agent flow channel 111 on both sides of the first silicon wafer and to separately produce the front second internal cooling medium flow channel and the back oxidizing agent flow channel 113 on both sides of the second silicon wafer through the alkaline solution (specifically, KOH solution, NaOH solution, or tetramethylammonium solution may be used) etching process.

A40. Separately produce the first inlet-outlet combination and the second inlet-outlet combination on the first silicon wafer and the second silicon wafer through the laser process, as shown in FIG. 4.

A50. Laminate the first silicon wafer and the second silicon wafer, and then place the two silicon wafers in a heating device for sintering at a high temperature. To prevent the silicon wafer from being oxidized in the sintering process and affecting a composite connection, inert gas may be input to the heating device to create an oxygen-free atmosphere. A selected heating temperature is close or equal to a eutectic temperature between silicon and nickel. The conductive material layers of the first silicon wafer and the second silicon wafer in contact with each other are melted down to stack the two silicon wafers together through a composite connection (in this case, the conductive material layers between the two silicon wafers and silicon surface layers in contact with the conductive material layers are fused and bonded with each other and cooled to form a firmly bonded integrated silicon metal conductive alloy composite structure, and a composition effect is very excellent). The back first internal cooling medium flow channel and the front second internal cooling medium flow channel correspondingly match each other to form the internal cooling medium flow channel 112 through the composite connection, and the first inlet-outlet combination and the second inlet-outlet combination correspondingly match each other to form the silicon plate inlet-outlet combination through the composite connection.

In other embodiments of the present invention, step A40 may be performed before step A30 or step A20.

Specifically preferably, Embodiment 1 provides a method for producing the end-mounted silicon plate 130 described above, including the following operation steps:

A10'. Prepare a first silicon wafer and a second silicon wafer.

A20'. Separately produce conductive material layers on one side of the first silicon wafer and both sides of the second silicon wafer through a screen printing process.

A30'. Use the conductive material layers as masking layers, to separately produce the back first internal cooling medium flow channel on one side of the first silicon wafer and to separately produce the front second internal cooling medium flow channel and the back oxidizing agent flow channel 132 on both sides of the second silicon wafer through an alkaline solution etching process.

A40'. Separately produce the first inlet-outlet combination and the second inlet-outlet combination on the first silicon wafer and the second silicon wafer through a laser process.

A50'. Laminate the first silicon wafer and the second silicon wafer, and then place the two silicon wafers in a heating device for sintering at a high temperature. A selected heating temperature is close or equal to a eutectic temperature between silicon and nickel. The conductive material layers of the first silicon wafer and the second silicon wafer in contact with each other are melted down to stack the two silicon wafers together through a composite connection. The back first internal cooling medium flow channel and the front second internal cooling medium flow channel correspondingly match each other to form the internal cooling medium flow channel through the composite connection, and the first inlet-outlet combination and the second inlet-outlet combination correspondingly match each other to form the silicon plate inlet-outlet combination through the composite connection.

In other embodiments of the present invention, step A40' may be performed before step A30' or step A20'.

A method for producing the end-mounted silicon plate 130' in Embodiment 1 is the same as the method for producing the end-mounted silicon plate 130, and details are omitted for simplicity. The method for producing the end-mounted silicon plates 130 and 130' in Embodiment 1 is basically the same as the method and principle for producing the middle silicon plate 110, except that the end-mounted silicon plates 130 and 130' are located at the ends, are connected to external installation end plates, and do not have adjacent fuel cell units. Therefore, the end-mounted silicon wafer of the end-mounted silicon plate 130 does not need to be provided with the front reducing agent flow channel 132', and the end-mounted silicon wafer of the end-mounted silicon plate 130' does not need to be provided with the back oxidizing agent flow channel 132. Therefore, there is such a slight difference described above in the production method.

In other embodiments of the present invention, all or some of the middle silicon plates or all or some of the middle silicon plates and the end-mounted silicon plates each may be produced by using more than two silicon wafers, for example, three or four silicon wafers, so that an effective area of the cooling medium flow channel 112 can be increased, and a heat dissipation effect of the fuel cell can be further improved. However, clearly, the application of more silicon wafers causes an increase in a volume of the fuel cell stack structure and further reduces power density. Therefore, a person skilled in the art can specifically select a quantity of silicon wafers based on characteristics of a fuel cell product to be actually applied, to finally achieve optimal balance between various types of performance.

Preferably, Embodiment 1 further provides a fuel cell. The fuel cell includes a stack structure, a packaging insulator (not shown in the figure), and an external installation fitting (not shown in the figure). The packaging insulator is mainly used to implement insulating packaging of the stack structure, and is connected to the external installation fitting to facilitate final fuel cell installation and power output. The stack structure is the fuel cell stack structure 100 described above. The packaging insulator and the external installation fitting in this embodiment of the present invention may be directly any one of packaging insulators and external installation fittings in the existing technologies. Specifically, the packaging insulator may be a rubber, a hot melt adhesive, a hot cross-linked type, or any ultraviolet cross-linked insulator. Because the part of the packaging insulator and the external installation fitting is not innovative content of the present invention, details are omitted for simplicity in this embodiment of the present invention.

Preferably, Embodiment 1 further provides an application of the fuel cell described above. The fuel cell is applied to an automotive product. Certainly, in other embodiments of the present invention, the fuel cell may be applied to a portable product (for example, any auxiliary power supply apparatus), a stationary power supply or thermal apparatus product (for example, a large-scale combined heat and power apparatus or a continuous power supply apparatus), or other types of transportation products (for example, any transportation such as a logistics trolley).

Embodiment 2

Figure 6:
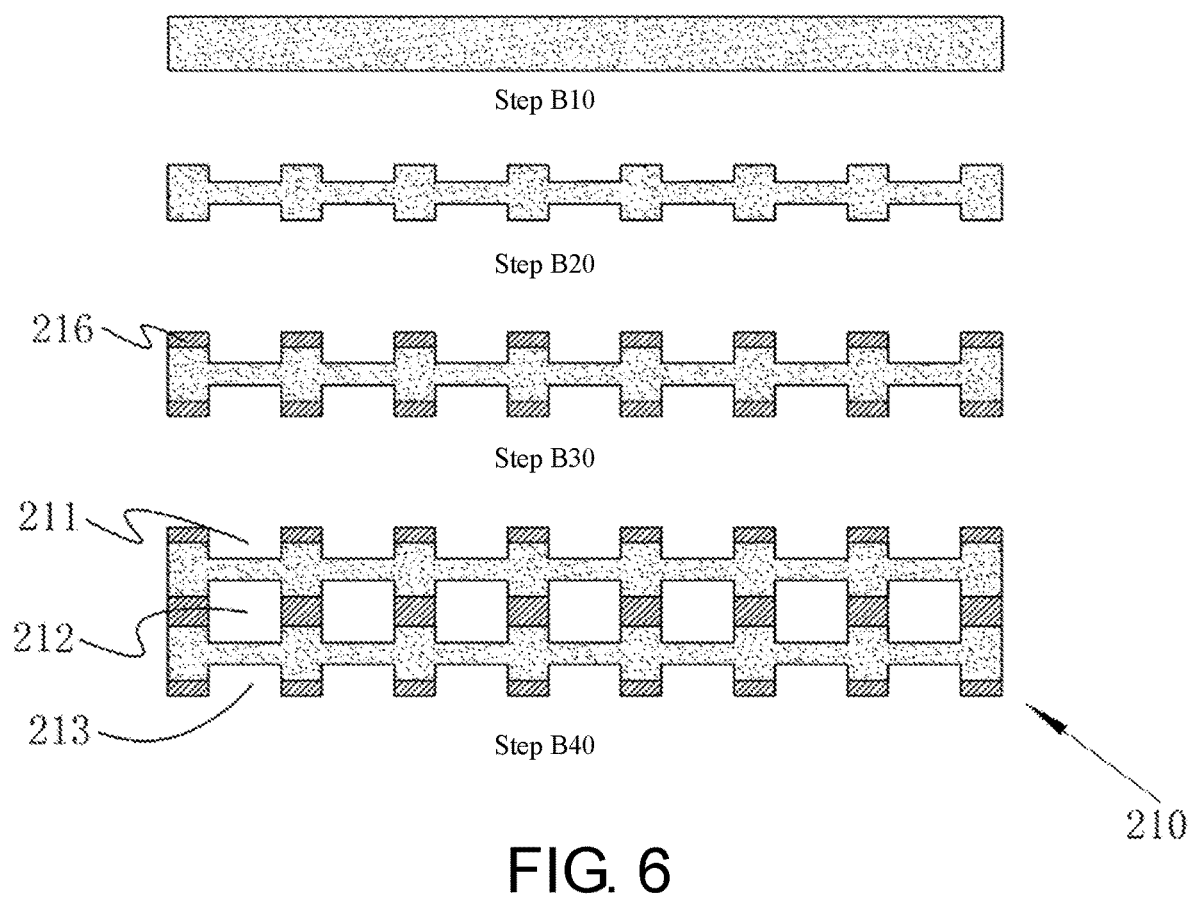
FIG. 6 is a flowchart of a production process of a middle silicon plate 210 according to Embodiment 2 of the present invention.

A technical solution of Embodiment 2 is the same as that of Embodiment 1, except that in Embodiment 2, a silicon wafer is a monocrystalline or polycrystalline phosphorus-doped or boron-doped silicon wafer. Preferably, the silicon wafer has a resistivity in a range of 0.0005-0.05 $\Omega \cdot cm$. As shown in FIG. 6, a method for producing a middle silicon plate 210 includes the following operation steps:

B10. Prepare a first silicon wafer and a second silicon wafer.

B20. Separately produce a back first internal cooling medium flow channel, a front reducing agent flow channel 211, and a first inlet-outlet combination on both sides of the first silicon wafer and separately produce a front second internal cooling medium flow channel, a back oxidizing agent flow channel 213, and a second inlet-outlet combination on both sides of the second silicon wafer through a laser process.

B30. Separately produce conductive material layers 216 on both sides of the first silicon wafer and the second silicon wafer through a screen printing process.

B40. Laminate the first silicon wafer and the second silicon wafer, and then place the two silicon wafers in a heating device for sintering at a high temperature. The conductive material layers 216 of the first silicon wafer and the second silicon wafer in contact with each other are melted down to stack the two silicon wafers together through a composite connection. The back first internal cooling medium flow channel and the front second internal cooling medium flow channel correspondingly match each other to form an internal cooling medium flow channel 212 through the composite connection, and the first inlet-outlet combination and the second inlet-outlet combination correspondingly match each other to form a silicon plate inlet-outlet combination through the composite connection.

As in Embodiment 1, an end-mounted silicon plate and the middle silicon plate 210 in this embodiment differ only in that an end-mounted silicon wafer of the end-mounted silicon plate does not need to be provided with a reducing agent flow channel or an oxidizing agent flow channel. Therefore, during implementation, a person skilled in the art can set a method for producing the end-mounted silicon plate with reference to the method for producing the middle silicon plate 210 in this embodiment and structure characteristics of the end-mounted silicon plate without creative efforts. Therefore, details about the method for producing the end-mounted silicon plate are omitted for simplicity in Embodiment 2.

Embodiment 3

Figure 7:
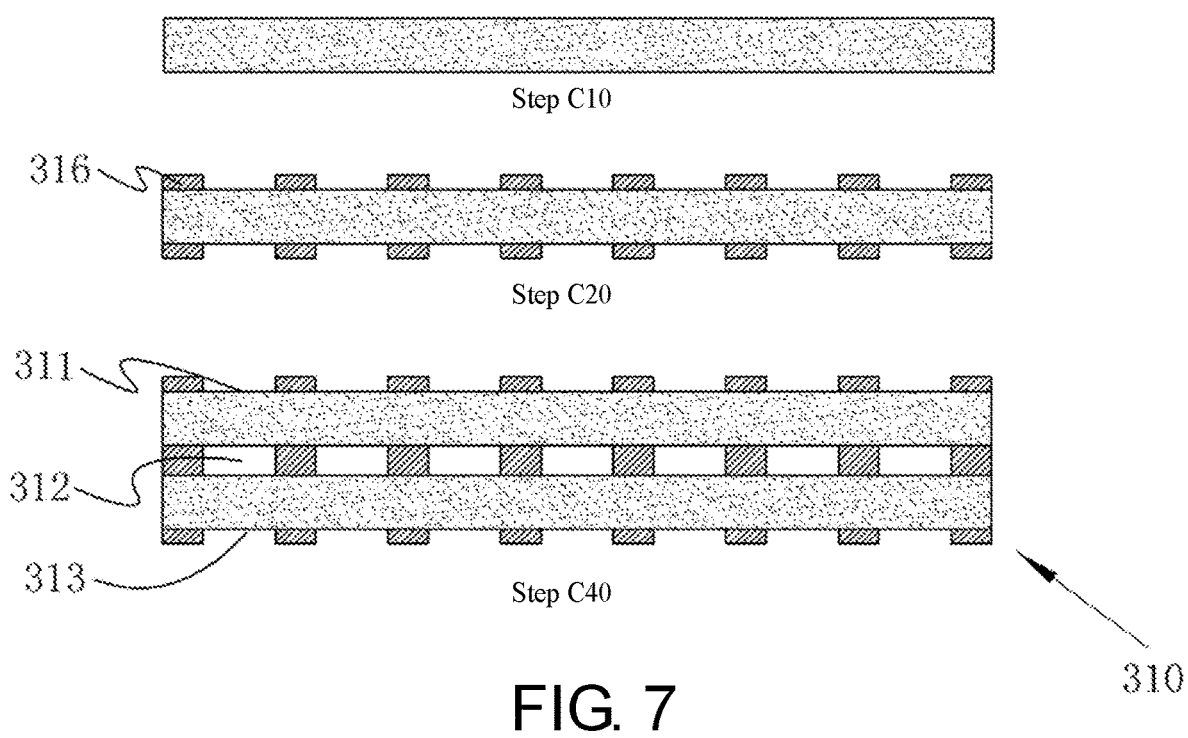
FIG. 7 is a flowchart of a production process of a middle silicon plate 310 according to Embodiment 3 of the present invention.

A technical solution of Embodiment 3 is the same as that of Embodiment 1, except that in Embodiment 3, a silicon wafer is a monocrystalline or polycrystalline phosphorus-doped or boron-doped silicon wafer. Preferably, the silicon wafer has a resistivity in a range of 0.0005-0.05 Ω·cm. As shown in FIG. 7, a method for producing a middle silicon plate 310 includes the following operation steps:

C10. Prepare a first silicon wafer and a second silicon wafer.

C20. Separately produce conductive material layers 316 on both sides of the first silicon wafer and the second silicon wafer directly through a screen printing process. After the conductive material layers 316 are formed, a back first internal cooling medium flow channel and a front reducing agent flow channel 311 may be directly formed on the first silicon wafer, and a front second internal cooling medium flow channel and a back oxidizing agent flow channel 313 may be directly formed on the second silicon wafer. A material used in the screen printing process is a conductive material, which may be specifically a silver paste material, an aluminum paste material, or the like.

C30. Separately produce a first inlet-outlet combination and a second inlet-outlet combination on the first silicon wafer and the second silicon wafer through a laser process. In other embodiments, step C30 may be performed before step C20.

C40. Laminate the first silicon wafer and the second silicon wafer, and then place the two silicon wafers in a heating device for sintering at a high temperature. Preferably, a selected heating temperature is set to a eutectic temperature between silicon and the conductive material. The conductive material layers 316 of the first silicon wafer and the second silicon wafer in contact with each other are melted down to stack the two silicon wafers together through a composite connection. The back first internal cooling medium flow channel and the front second internal cooling medium flow channel correspondingly match each other to form an internal cooling medium flow channel 312 through the composite connection, and the first inlet-outlet combination and the second inlet-outlet combination correspondingly match each other to form a silicon plate inlet-outlet combination through the composite connection.

To minimize impact on a flow channel structure and shape during high-temperature sintering, in other embodiments of the present invention, the material used in the screen printing process in step C20 may be alternatively a carbon paste material. Because a melting point of carbon is high, the flow channel shape can be effectively protected. However, because a eutectic reaction is not inclined to occur between the carbon and silicon, to implement effective high-temperature melting and composition between the silicon wafers, it is necessary to add the step of producing a conductive material layer before step C40. The process may also be the screen printing process or another process to finally implement high-temperature sintering, melting, and composition in step C40. For details, reference may be made to the steps of producing the conductive material layer in Embodiment 1 to Embodiment 3. In this way, flow channels are protected, and the composite connection between the silicon wafers is implemented. However, clearly, the production process becomes relatively complex.

As in Embodiment 1, an end-mounted silicon plate and the middle silicon plate 310 in this embodiment differ only in that an end-mounted silicon wafer of the end-mounted silicon plate does not need to be provided with a reducing agent flow channel or an oxidizing agent flow channel. Therefore, during implementation, a person skilled in the art can set a method for producing the end-mounted silicon plate with reference to the method for producing the middle silicon plate 310 in this embodiment and structure characteristics of the end-mounted silicon plate without creative efforts. Therefore, details about the method for producing the end-mounted silicon plate are omitted for simplicity in Embodiment 3.

Embodiment 4

Figure 8:
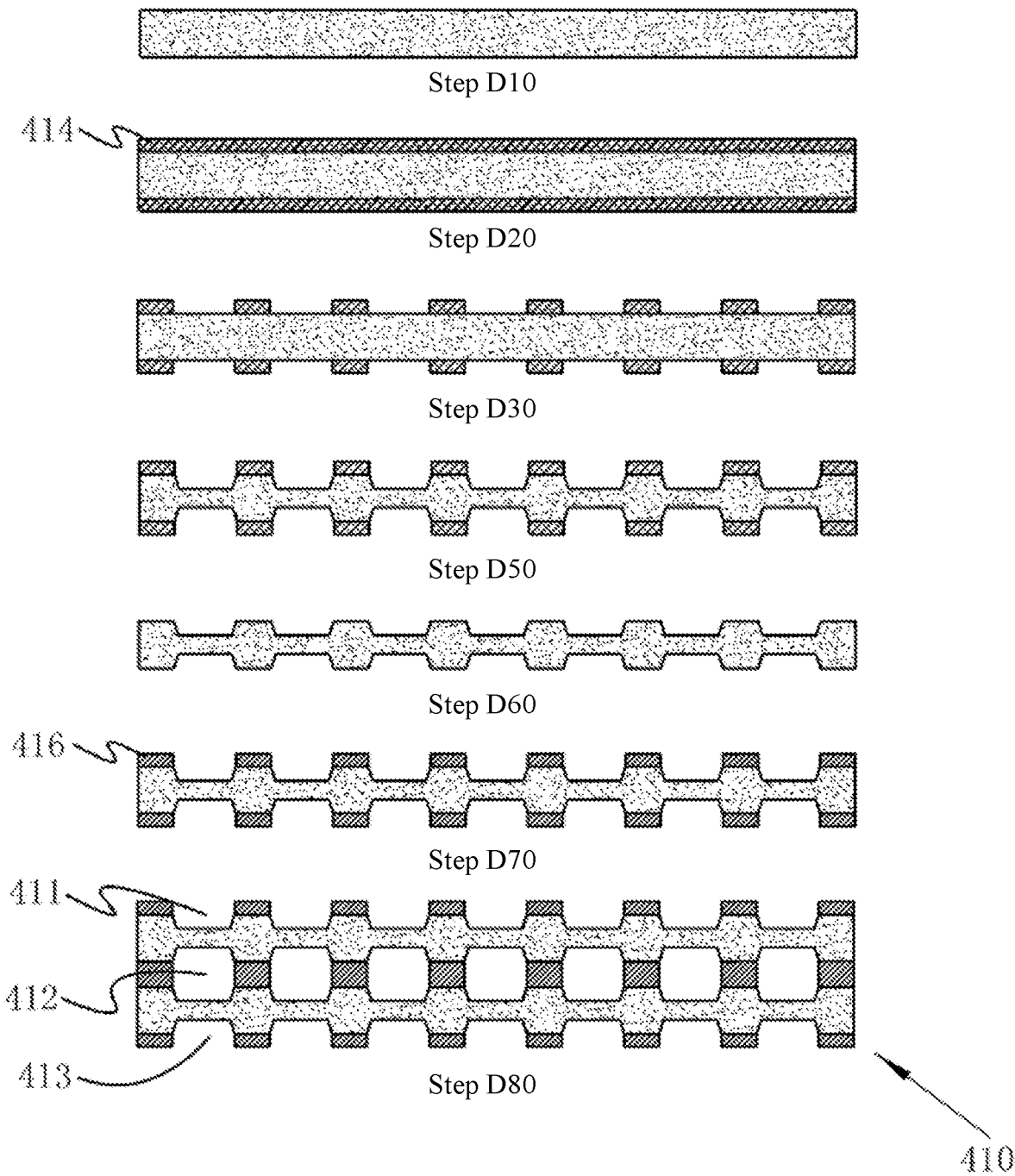
FIG. 8 is a flowchart of a production process of a middle silicon plate 410 according to Embodiment 4 of the present invention.

A technical solution of Embodiment 4 is the same as that of Embodiment 1, except that in Embodiment 4, as shown in FIG. 8, a method for producing a middle silicon plate 410 includes the following operation steps:

D10. Prepare a first silicon wafer and a second silicon wafer.

D20. Separately produce thermally oxidized silicon dioxide layers 414 on both sides of the first silicon wafer and the second silicon wafer.

D30. Design the thermally oxidized silicon dioxide layers 414 into masking layers through a photolithography process or a laser process.

D40. Separately produce a first inlet-outlet combination and a second inlet-outlet combination on the first silicon wafer and the second silicon wafer through the laser process. In other embodiments, step D40 may be performed before step D30 or D20 or after step D50, D60, or D70.

D50. Separately produce a back first internal cooling medium flow channel and a front reducing agent flow channel 411 on both sides of the first silicon wafer and separately produce a front second internal cooling medium flow channel and a back oxidizing agent flow channel 413 on both sides of the second silicon wafer through an alkaline solution etching process.

D60. Remove residual silicon dioxide layers on the first silicon wafer and the second silicon wafer.

D70. Separately produce conductive material layers 416 on both sides of the first silicon wafer and the second silicon wafer through a screen printing process.

D80. Laminate the first silicon wafer and the second silicon wafer, and then place the two silicon wafers in a heating device for sintering at a high temperature. Preferably, a selected heating temperature is set to a eutectic temperature between silicon and the conductive material. The conductive material layers 416 of the first silicon wafer and the second silicon wafer in contact with each other are melted down to stack the two silicon wafers together through a composite connection. The back first internal cooling medium flow channel and the front second internal cooling medium flow channel correspondingly match each other to form an internal cooling medium flow channel 412 through the composite connection, and the first inlet-outlet combination and the second inlet-outlet combination correspondingly match each other to form a silicon plate inlet-outlet combination through the composite connection.

As in Embodiment 1, an end-mounted silicon plate and the middle silicon plate 410 in this embodiment differ only in that an end-mounted silicon wafer of the end-mounted silicon plate does not need to be provided with a reducing agent flow channel or an oxidizing agent flow channel. Therefore, during implementation, a person skilled in the art can set a method for producing the end-mounted silicon plate with reference to the method for producing the middle silicon plate 410 in this embodiment and structure characteristics of the end-mounted silicon plate without creative efforts. Therefore, details about the method for producing the end-mounted silicon plate are omitted for simplicity in Embodiment 4.

The present invention describes only the foregoing embodiments, and a person skilled in the art can select a specific production process and change the order of some steps based on actual application needs, to obtain other embodiments. These replacements in the production process also fall within the scope of the present invention. Because the specific production process steps (for example, the etching process, the photolithography process, the laser process, and the screen printing process) provided in the present invention all belong to the existing technologies, a person skilled in the art can select related technical parameters of the specific process steps based on actual conditions. Details are not listed in the embodiments of the present invention.

It should also be noted that in the production process flowcharts of FIG. 5 to FIG. 8 in the embodiments of the present invention, only a single silicon wafer is shown in a step diagram before a composite connection between two silicon wafers. Because step diagrams of the two silicon wafers are identical, only a step diagram of a single silicon wafer is shown for simplicity.

In the present invention, through a large quantity of embodiments, it is verified that directly using a silicon plate as a silicon plate of a fuel cell stack structure can fully achieve characteristics of a good gas barrier function, relatively high thermal conductivity, a relatively low volume resistivity and contact resistivity, high corrosion resistance, a light weight, high strength, being suitable for batch processing, and the like needed by a bipolar plate of a fuel cell. In addition, compared with a metal plate, a graphite plate, or a composite material plate in the existing technologies, the silicon plate provided in the present invention has greater advantages in service life, costs, efficiency, and power density. To better illustrate the excellent performance achieved by the embodiments of the present invention, reference may be made to performance comparison of important technical indicators between a fuel cell to which the silicon plate in the present invention is applied and fuel cells based on various existing plates in Table 1:

TABLE 1

Performance comparison of important technical indicators between a fuel cell based on the silicon plate in the present invention and fuel cells based on various existing plates

| Technical indicator | Graphite plate | Metal plate | Silicon plate |
| --- | --- | --- | --- |
| Cost ($/kW) | 300 | 400 | 250 |
| Service life (hour) | 7000 | 5000 | 7000 |
| Volume power density (kW/L) | 0.5-1.5 | 2-3.2 | 2-5 |
| Weight power density (kW/L) | 0.5-3 | 1.2-4 | 2-3.5 |

Additional Information:
1. Cost

First, silicon is one of the most abundant elements on the earth. With the development of integrated circuits and photovoltaic industries to which silicon materials are applied, crystalline silicon materials are getting cheaper. As a plate of a fuel cell, the silicon has lower costs than stainless steel, graphite, and other materials, and has more space for reducing material costs.

Further, because crystalline silicon has very excellent characteristics of fine processing (for example, the etching process, the photolithography process, the laser process, and the screen printing process mentioned in the present invention), the present invention can greatly reduce depths and widths of an oxidizing agent flow channel and a reducing agent flow channel, thereby reducing stress on an electrolyte membrane, a cathode, and an anode in a fuel cell stack structure. Therefore, the fuel cell can use a thinner electrode material and dielectric film material, increasing a diffusion and transport speed of an oxidizing agent, a reducing agent, and a reaction product in the electrode, and reducing a diffusion length of ions in a dielectric film. In this way, a power generation current of the fuel cell per unit area is increased while costs of the electrolyte membrane, the cathode, and the anode per watt are indirectly and significantly reduced.

2. Service Life

Because the crystalline silicon material has very high chemical stability in both an acid-alkaline environment and an electrochemical environment, avoiding the disadvantage that the metal plate fuel cell is not resistant to corrosion, the silicon plate in the present invention can be used for a long time without failure. Generally, a service life of the silicon plate fuel cell to which the silicon plate is applied is determined by other components. The service life data performance provided in Table 1 of the present invention is based on data of an existing fuel cell with a long service life. As performance of other components is upgraded and optimized, the service life of the silicon plate fuel cell in the present invention will increase. In addition, the long service life of the silicon plate fuel cell further reduces the costs.

3. Volume Power Density and Weight Power Density

The silicon plate fuel cells can have high current density, thereby increasing volume power density of the stack structure.

Because the crystalline silicon has very excellent characteristics of fine processing, a relatively thin silicon plate can be used to produce the stack structure. The silicon plate stack structure has the smallest thickness compared with stack structures obtained by stacking the same quantity of monofuel cells. In particular, advantages of the silicon plate stack structure are particularly significant compared with a graphite plate stack structure. Therefore, the silicon plate stack structure has the highest volume power density.

The silicon material has lower weight density than a metal material, and is thinner than a graphite material. Therefore, the silicon plate fuel cell has higher weight power density.

The silicon plate fuel cell in the present invention has high energy density the same as or higher than that of the metal plate fuel cell, and has the same excellent service life performance as the graphite plate fuel cell, and the silicon plate has characteristics of low material costs and a simple production process. Therefore, the costs of the silicon plate fuel cell are lower than those of fuel cells based on other materials, and the silicon plate fuel cell also has outstanding advantages in main technical indicators such as durability and power density of the fuel cell. The technical effects and breakthroughs of the present invention are inconceivable to a person of ordinary skill in the art of fuel cells, and the present invention cannot be derived from any technical inspiration in existing technical data. Therefore, the present invention is undoubtedly of high significance and plays a core promotion role in a mass industrialization process of fuel cells.

As described above, during implementation, the present invention may be applied to a fuel cell with a stack structure having a relatively large quantity of fuel cell units, and certainly, the present invention may also be applied to a fuel cell (usually referred to as a micro fuel cell) including only one or two fuel cell units. For details, reference may be made to Embodiment 5 and Embodiment 6.

Embodiment 5

Figure 9:
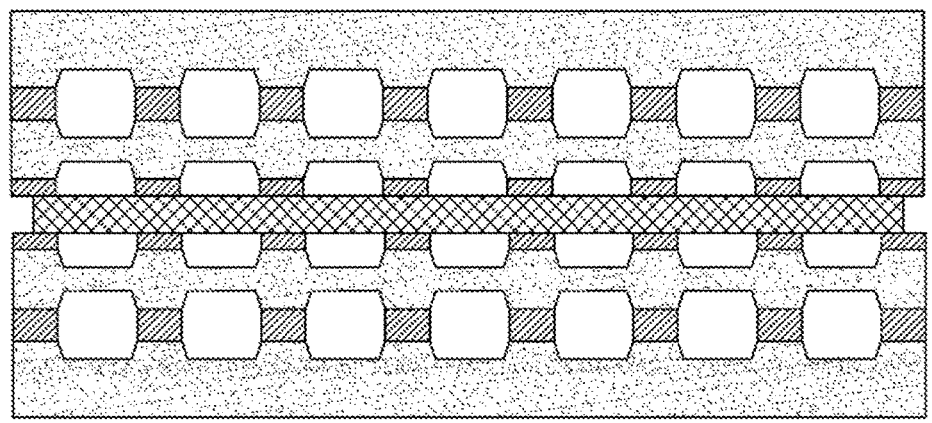
FIG. 9 is a cross-sectional schematic structural diagram of a fuel cell unit 10 in a micro fuel cell according to Embodiment 5 of the present invention.

A technical solution of Embodiment 5 is the same as that of Embodiment 1, except that in Embodiment 5, as shown in FIG. 9, a fuel cell includes one fuel cell unit 10, including an anode plate, an anode electrode, an electrolyte membrane, a cathode electrode, and a cathode plate stacked together in sequence. The cathode plate and the anode plate are end-mounted silicon plates made of doped conductive crystalline silicon materials. The anode electrode, the electrolyte membrane, and the cathode electrode are MEAs.

Embodiment 6

Figure 10:
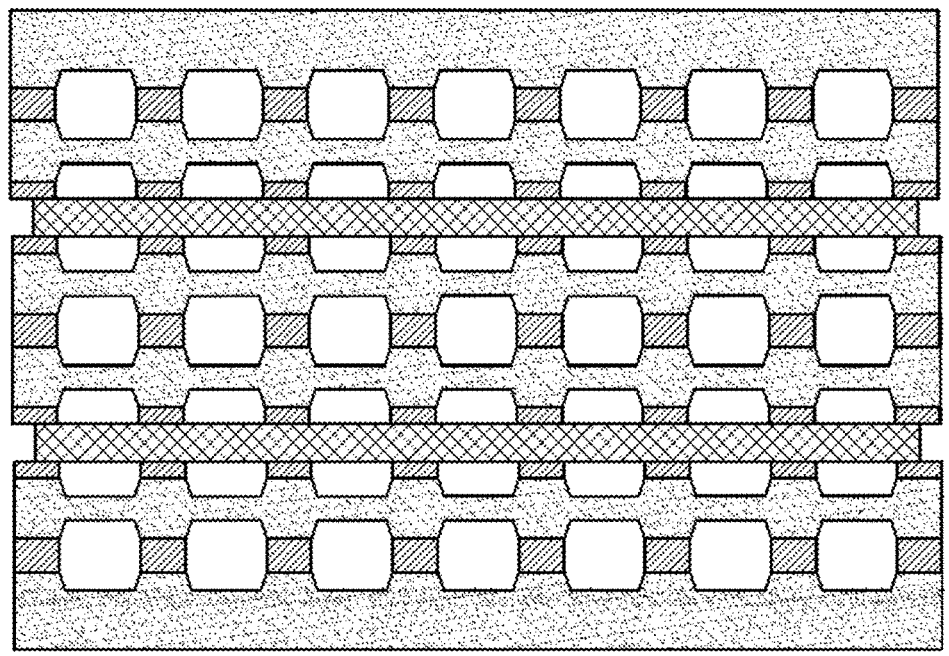
FIG. 10 is a cross-sectional schematic structural diagram of fuel cell units 20a and 20b in a micro fuel cell according to Embodiment 6 of the present invention.

A technical solution of Embodiment 6 is the same as that of Embodiment 1, except that in Embodiment 6, as shown in FIG. 10, a fuel cell includes a first fuel cell unit 20a and a second fuel cell unit 20b that are connected in series and stacked together, and each of the first fuel cell unit 20a and the second fuel cell unit 20b includes an anode plate, an anode electrode, an electrolyte membrane, a cathode electrode, and a cathode plate stacked together in sequence. The anode electrode, the electrolyte membrane, and the cathode electrode are MEAs. The anode plate of the first fuel cell unit 20a and the cathode plate of the second fuel cell unit 20b are end-mounted silicon plates made of doped conductive crystalline silicon materials, the cathode plate of the first fuel cell unit 20a is a middle silicon plate made of a doped conductive crystalline silicon material, and the middle silicon plate also serves as the anode plate of the second fuel cell unit 20b.

The fuel cells provided in Embodiment 5 and Embodiment 6 of the present invention are usually micro fuel cells with relatively low output power. Compared with an existing micro fuel cell using silicon as a plate substrate, the micro fuel cells in Embodiment 5 and Embodiment 6 do not need to be provided with additional metal layer membranes as conductive layers, and therefore, has more excellent performance in material costs and a production process. In addition, in Embodiment 5 and Embodiment 6, because a silicon plate with an internal flow channel is obtained through composition of two silicon wafers, the silicon plate has high mechanical strength as a skeleton structure of the fuel cell, and the internal flow path can be directly used as a cooling medium flow channel, thereby further improving cooling performance of the micro fuel cell, and overcoming the disadvantage in the existing technologies that the micro fuel cell using silicon as a substrate cannot be cooled.

It is clear to a person skilled in the art that the present invention is not limited to the details about the foregoing example embodiments, and that the present invention can be implemented in other specific forms without departing from the spirit or essential features of the present invention. Therefore, the embodiments should be considered in all respects as examples and non-limiting, and the scope of the present invention should be defined by the appended claims instead of the foregoing description. Therefore, all changes falling within the meaning and range of equivalent elements of the claims shall be included in the present invention. Any reference numeral in the claims shall not be construed as limiting the claims.

In addition, it should be understood that, although this specification has been described with reference to embodiments, not every embodiment includes only one independent technical solution, and such description of this specification is by way of clarity only. A person skilled in the art should take this specification as a whole, and the technical solutions of the embodiments may be combined as appropriate to obtain other embodiments that can be understood by a person skilled in the art.

What is claimed is:

1. A silicon plate, wherein the silicon plate is a middle silicon plate that is made of a doped conductive crystalline silicon material, and has flow channels including an internal cooling medium flow channel, a front reducing agent flow channel, and/or a back oxidizing agent flow channel, and each of the internal cooling medium flow channel, the front reducing agent flow channel, and the back oxidizing agent flow channel is provided with a middle silicon plate inlet-outlet combination connected to thereof;

the middle silicon plate comprises a first middle silicon wafer and a second middle silicon wafer, wherein a crystal direction of each of the first middle silicon wafer and the second middle silicon wafer is not <111>, each of the first middle silicon wafer and the second middle silicon wafer includes the flow channels located on both sides of the first middle silicon wafer and the second middle silicon wafer, and wherein conductive material layers are located on the both sides of the first middle silicon wafer and the second middle silicon wafer, the conductive material layers are used as masking layers, whereby a back first internal cooling medium flow channel and the front reducing agent flow channel are formed on the both sides of the first middle silicon wafer through an alkaline solution etching process, and a front second internal cooling medium flow channel and the back oxidizing agent flow channel are formed on the both sides of the second middle silicon wafer through the alkaline solution etching process, the first middle silicon wafer is stacked on the second middle silicon wafer, whereby the conductive material layers of the first middle silicon wafer and the second middle silicon wafer in contact with each other are melted down to form a composite connection that compositely connect the first middle silicon wafer to the second middle silicon wafer, the back first internal cooling medium flow channel and the front second internal cooling medium flow channel correspondingly match each other to form the internal cooling medium flow channel through the composite connection, the front reducing agent flow channel is located on a non-stacked side of the first middle silicon wafer, and the back oxidizing agent flow channel is located on a non-stacked side of the second middle silicon wafer, and wherein the conductive material layers are formed of a metal conductive material having a eutectic bonding effect with a silicon material.

2. The silicon plate according to claim 1, wherein the doped conductive crystalline silicon material is a monocrystalline or polycrystalline doped silicon wafer, and has a resistivity not greater than 0.1 Ω·cm.

3. The silicon plate according to claim 2, wherein the first middle silicon wafer and the second middle silicon wafer have a thickness in a range of 0.2-5 mm and a dimension in a range of 50-300 mm.

4. A method of applying a silicon material to a fuel cell, wherein the fuel cell comprises one or more fuel cell units, and the fuel cell unit comprises an anode plate, an anode electrode, an electrolyte membrane, a cathode electrode, and a cathode plate stacked together in sequence, wherein the silicon material is applied to form the cathode plate and the anode plate as silicon plates made of doped conductive crystalline silicon materials; and each of the silicon plates is formed by applying the silicon plate according to claim 1.

5. The method according to claim 4, wherein the silicon plate serves as both a cathode plate of a single fuel cell unit and an anode plate of its adjacent single fuel cell unit.

6. A fuel cell stack structure, wherein the stack structure comprises at least three fuel cell units that are connected in series and stacked together; and the fuel cell unit comprises an anode plate, an anode electrode, an electrolyte membrane, a cathode electrode, and a cathode plate stacked together in sequence, wherein the cathode plate and the anode plate are silicon plates made of doped conductive crystalline silicon materials; and each of the silicon plates is the middle silicon plate according to claim 1.

7. The fuel cell stack structure according to claim 6, wherein the middle silicon plate serves as both a cathode plate of a single fuel cell unit and an anode plate of its adjacent single fuel cell unit.

8. The fuel cell stack structure according to claim 6, wherein the stack structure comprises end-mounted fuel cell units located at both ends and one or more middle fuel cell units located in the middle, wherein the end-mounted fuel cell units and the one or more middle fuel cell units are connected in series and stacked together, wherein the middle fuel cell unit includes the at least three fuel cell units that comprises the middle silicon plate.

9. The fuel cell stack structure according to claim 8, wherein the end-mounted fuel cell unit comprises an end-mounted silicon plate and the middle silicon plate, wherein the end-mounted silicon plate has an internal cooling medium flow channel and a front reducing agent flow channel or a back oxidizing agent flow channel, and each of the internal cooling medium flow channel, the front reducing agent flow channel, or the back oxidizing agent flow channel is provided with a silicon plate inlet-outlet combination connected to thereof.

10. The fuel cell stack structure according to claim 6, wherein a reducing agent is hydrogen gas, natural gas, coal gas, purified gas, or methanol, and an oxidizing agent is oxygen or air.

11. The fuel cell stack structure according to claim 6, wherein the anode electrode, the electrolyte membrane, and the cathode electrode are membrane electrode assemblies (MEA), and the electrolyte membrane is a proton exchange membrane.

12. The fuel cell stack structure according to claim 6, wherein a cooling medium is water.

* * * * *